US012699418B2

(12) United States Patent
    Lee

(10) Patent No.: US 12,699,418 B2
(45) Date of Patent: Aug. 4, 2026

(54) DISPLAY DEVICE

(71) Applicant: LG Display Co., Ltd., Seoul (KR)

(72) Inventor: Youngbin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 90 days.

(21) Appl. No.: 18/767,861

(22) Filed: Jul. 9, 2024

(65) Prior Publication Data

US 2025/0208650 A1    Jun. 26, 2025

(30) Foreign Application Priority Data

Dec. 22, 2023    (KR) ........................ 10-2023-0189282

(51) Int. Cl.
    G06F 1/16            (2006.01)
(52) U.S. Cl.
    CPC .......... G06F 1/1616 (2013.01); G06F 1/1656
        (2013.01); G06F 1/1681 (2013.01)
(58) Field of Classification Search
    CPC ..... G06F 1/1616; G06F 1/1656; G06F 1/1681
    See application file for complete search history.

(56) References Cited

U.S. PATENT DOCUMENTS

| | | | | | |
|---|---|---|---|---|---|
| 10,331,176 | B2 * | 6/2019 | Kim | ..................... | G06F 1/1652 |
| 11,656,655 | B2 * | 5/2023 | Shin | ..................... | G06F 1/1641 |
| | | | | | 361/679.27 |
| 11,729,932 | B2 * | 8/2023 | Yun | ..................... | G06F 1/1641 |
| | | | | | 361/807 |
| 12,135,071 | B2 * | 11/2024 | Jia | ..................... | G06F 1/1681 |
| 12,324,113 | B2 * | 6/2025 | Yun | ..................... | G06F 1/1681 |
| 12,332,700 | B2 * | 6/2025 | Yun | ..................... | G06F 1/1637 |
| 12,339,705 | B2 * | 6/2025 | Shin | ..................... | H04M 1/0216 |
| 12,360,574 | B2 * | 7/2025 | Yun | ..................... | H05K 5/0017 |
| 2018/0059736 | A1 * | 3/2018 | Kim | ..................... | G06F 1/1641 |
| 2019/0278338 | A1 * | 9/2019 | Siddiqui | .............. | G06F 1/1656 |
| 2022/0011819 | A1 * | 1/2022 | Shin | ..................... | G06F 1/1641 |
| 2022/0159845 | A1 | 5/2022 | Feng | | |
| 2022/0210937 | A1 * | 6/2022 | Yun | ..................... | H05K 5/0226 |
| 2022/0316559 | A1 * | 10/2022 | Jia | ..................... | G06F 1/1681 |

(Continued)

FOREIGN PATENT DOCUMENTS

| | | | | | |
|---|---|---|---|---|---|
| CN | 112150921 | A | 12/2020 | | |
| EP | 4072109 | B1 * | 2/2024 | .......... | H04M 1/0249 |

(Continued)

OTHER PUBLICATIONS

Intellectual Property Office of the United Kingdom, Combined Search and Examination Report, United Kingdom Patent Application No. GB2409686.9, Dec. 9, 2024, seven pages.

(Continued)

*Primary Examiner* — Michael Pervan

(74) *Attorney, Agent, or Firm* — Fenwick & West LLP

(57)            ABSTRACT

A display device includes a panel assembly including a display panel including a first unfolding area, a second unfolding area, and a folding area between the first unfolding area and the second unfolding area, and a plate under the display panel and including a slit pattern on the folding area, and a middle plate under the plate, wherein the middle plate includes a first middle plate portion on the first unfolding area, a second middle plate portion on the second unfolding area, and a vertical middle plate portion on the folding area.

19 Claims, 19 Drawing Sheets

(56)        References Cited

U.S. PATENT DOCUMENTS

| | | | |
|---|---|---|---|
| 2022/0374058 A1 | 11/2022 | Kim et al. | |
| 2023/0021638 A1* | 1/2023 | Yun | G06F 1/1681 |
| 2023/0209752 A1* | 6/2023 | Yun | H05K 5/0226 |
| | | | 361/807 |
| 2023/0213983 A1* | 7/2023 | Yun | G06F 1/1616 |
| | | | 361/679.27 |
| 2023/0244271 A1 | 8/2023 | Shin et al. | |
| 2023/0337381 A1* | 10/2023 | Yun | G06F 1/1652 |

FOREIGN PATENT DOCUMENTS

| | | | | |
|---|---|---|---|---|
| KR | 10-2007426 B1 | 8/2019 | | |
| WO | WO-2020242059 A1 * | 12/2020 | | H05K 5/10 |

OTHER PUBLICATIONS

Japan Patent Office, Office Action, Japanese Patent Application No. 2024-121155, May 20, 2025, six pages.

* cited by examiner

230: 230a, 230b
240: 240a, 240b

241: 241a, 241b

DISPLAY DEVICE

CROSS REFERENCE TO RELATED APPLICATION

The present application claims priority to Republic of Korea Patent Application No. 10-2023-0189282, filed Dec. 22, 2023, which is incorporated herein by reference in its entirety.

BACKGROUND

Technical Field

The present specification relates to a display device, and more specifically, to a foldable or unfoldable display device.

Description of the Related Art

Display devices are increasingly miniaturized to meet consumers' purchasing needs. Many manufacturers are making efforts to miniaturize display devices because the miniaturization can enhance design aspects, enhance portability, and show high technological abilities of the display devices.

In particular, display devices, which may be folded or conversely, unfolded in the folded state, have been developed. A display device may be folded or unfolded with respect to a hinge device. The display device is being applied to small-sized display devices such as smartphones and is also being applied to medium-sized display devices such as tablet PCs and laptops.

SUMMARY

The present specification is directed to providing a display device with improved flatness of a folding area after the display is folded/unfolded for a long time.

The present specification is also directed to providing a display device without application of an additional stress because a middle plate protruding toward a display panel is not in physical contact with the display panel.

The present specification is also directed to providing a display device with improved wrinkles of the display panel.

The present specification is also directed to providing a display device capable of preventing or at least reducing the application of an additional stress which may occur when the display panel sags because the middle plate protruding toward the display panel supports an upper structure.

The objects of the present specification are not limited to the above-described object, and other technical objects may be inferred from embodiments below.

To achieve the objectives, a display device according to one embodiment includes a panel assembly including a display panel including a first unfolding area, a second unfolding area, and a folding area between the first unfolding area and the second unfolding area, and a plate disposed under the display panel and including a slit pattern on the folding area, and a middle plate disposed under the plate, wherein the middle plate includes a first middle plate portion on the first unfolding area, a second middle plate portion on the second unfolding area, and a vertical middle plate portion on the folding area.

To achieve the objectives, a display device according to another embodiment includes a panel assembly including a display panel including a first unfolding area, a second unfolding area, and a folding area between the first unfolding area and the second unfolding area, and a plate disposed under the display panel, and a middle plate disposed under the plate, wherein a distance between the middle plate and the plate in the folding area is shorter than a distance between the middle plate and the plate in the first unfolding area.

Detailed matters of other embodiments are included in a detailed description and accompanying drawings.

The display device according to the embodiments can have the improved flatness of the folding area even when the folding/unfolding operations are repeated for a long time.

According to the display device according to the embodiments, since the middle plate protruding toward the display panel is not in physical contact with the display panel, there is no application of the additional stress, and thus it is possible to improve durability and lifetime.

According to the display device according to the embodiments, it is possible to improve the wrinkles of the display panel.

The slip may occur in the coupling layers of the display device according to the embodiments upon folding operation. However, since the middle plate may support the upper structures in the unfolded state, the display device can be easily restored after slip of the coupling layers.

However, the effects obtainable from the present specification are not limited to the above-described effects, and other effects that are not mentioned will be able to be clearly understood by those skilled in the art to which the present specification pertains from the following description.

DETAILED DESCRIPTION

Figure 1:
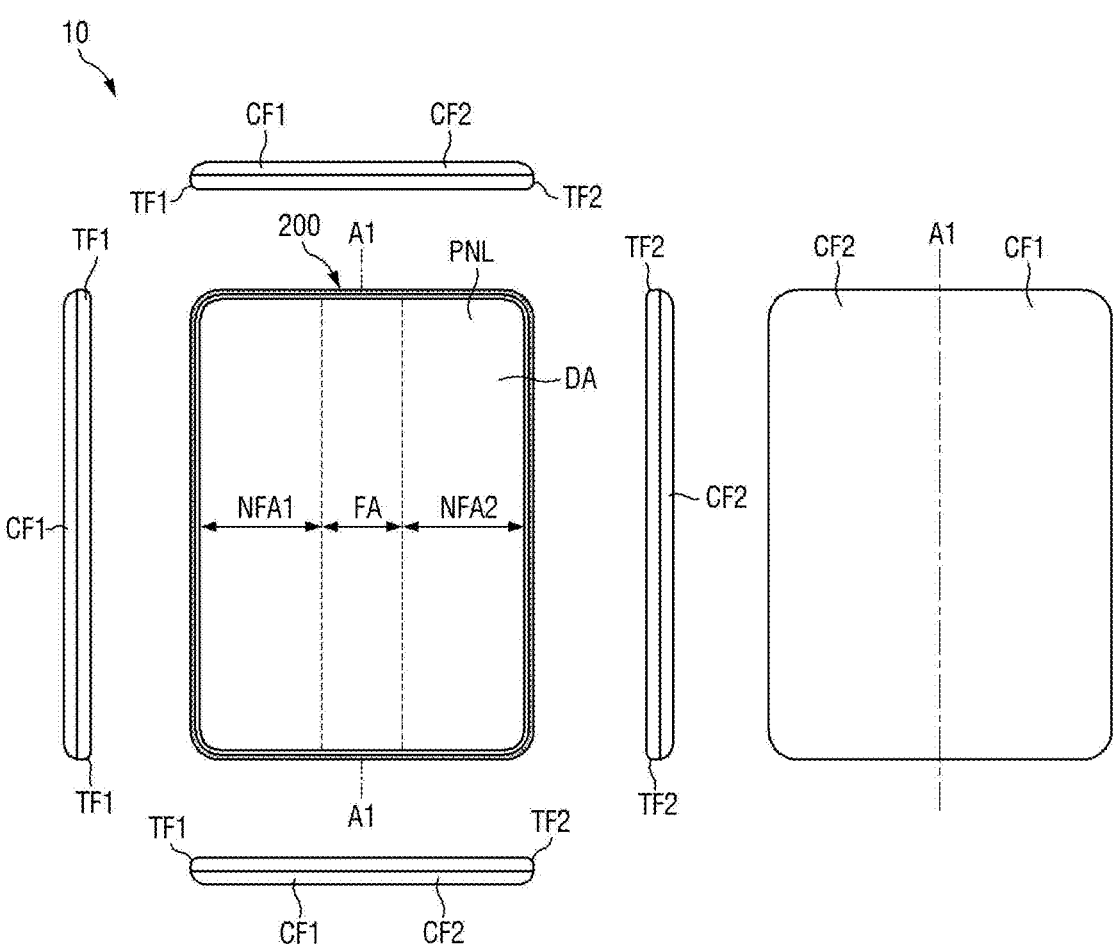
FIG. 1 is a view showing an unfolded state of a display device according to a first embodiment.

Hereinafter, embodiments will be described with reference to the accompanying drawings.

The same reference numerals indicate the same components. In addition, in the drawings, thicknesses, proportions, and dimensions of components can be exaggerated for effective description of technical contents. Scales of components illustrated in the drawings differ from the actual scale for convenience of description, and thus are not limited to the scales illustrated in the drawings.

In the specification, when a first component (or an area, a layer, a portion, or the like) is described as "on," "connected," or "coupled to" a second component, it means that the first component may be directly connected/coupled to the second component or a third component may be disposed therebetween.

The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings. For example, as long as "immediately" or "directly" is not used, one or more other portions may be positioned between two portions. The spatially relative terms "below or beneath," "lower," "above," "upper," and the like can be used to easily describe the correlation with one element or components and another element or components as shown in the drawings. The spatially relative terms should be understood as the terms including different directions of elements in use or operation in addition to the directions shown in the drawings. For example, in case of turning the element shown in the drawing upside down, an element described as being disposed "below" or "beneath" another element may be disposed "above" another element. Therefore, the exemplary term "below" may include both downward and upward directions.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

Features of various embodiments of the present specification can be coupled or combined partially or entirely, and various technological interworking and driving are possible, and the embodiments may be implemented independently of each other or implemented together in an associated relationship.

Hereinafter, a display device of the present specification will be described through the accompanying drawings and embodiments as follows.

Figure 2:
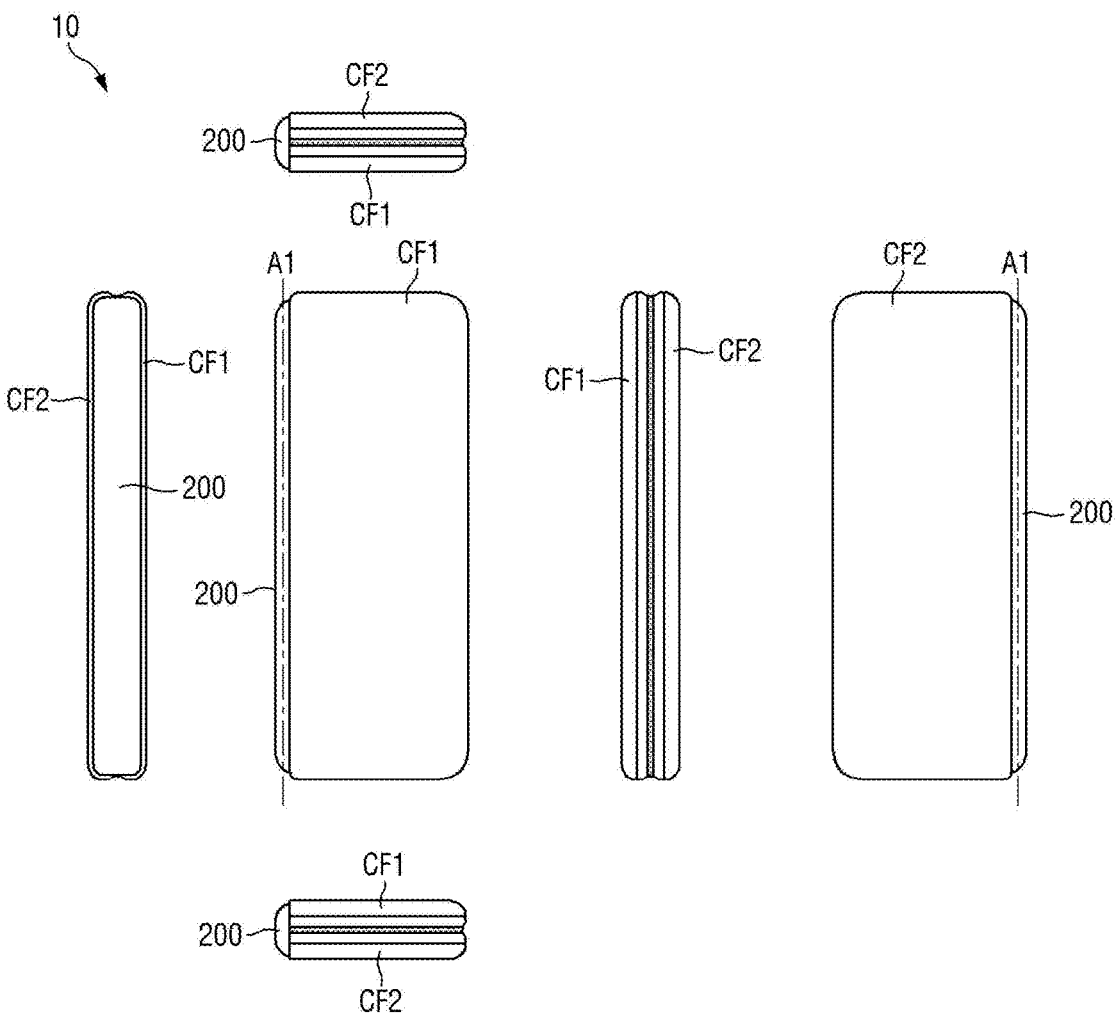
FIG. 2 is a view showing a folded state of the display device according to the first embodiment.

FIG. 1 is a view showing an unfolded state of a display device according to a first embodiment. FIG. 2 is a view showing a folded state of the display device according to the first embodiment.

Referring to FIG. 1, front, top, bottom, right, left, and back surfaces of a display device 10 in an unfolded state are shown. Referring to FIG. 2, the front, top, bottom, right, left, and back surfaces of the display device 10 in a folded state are shown.

Referring to FIG. 1, the display device 10 may include a display panel PNL including a display area DA including a plurality of pixels. A non-display area may be disposed around the display area DA. The non-display area may not include pixels and may be a bezel area. The display panel PNL may include a folding area FA, a first unfolding area NFA1 positioned at one side of the folding area FA, and a second unfolding area NFA2 positioned at the other side of the folding area FA. A portion corresponding to the display area DA among the first unfolding area NFA1, the folding area FA, and the second unfolding area NFA2 of the display panel PNL may display images.

The display device 10 includes a hinge assembly 200 which may rotate about a folding axis A1. The hinge assembly 200 may not be substantially visible from the front and rear surfaces of the display device 10 in the unfolded state. This is because the hinge assembly 200 is disposed on a rear portion of the display device 10 and covered by a cover frame CF.

The hinge assembly 200 may have a shape extending along the folding axis A1. The hinge assembly 200 may be disposed in the folding area FA. The folding area FA is an area where the display panel PNL is folded by the hinge assembly 200. The first unfolding area NFA1 and the second unfolding area NFA2 are areas which are symmetrical to each other with respect to the folding area FA. With respect to the folding axis A1, the first unfolding area NFA1 is an area positioned at one side, and the second unfolding area NFA2 is an area positioned at the other side.

Figure 3:
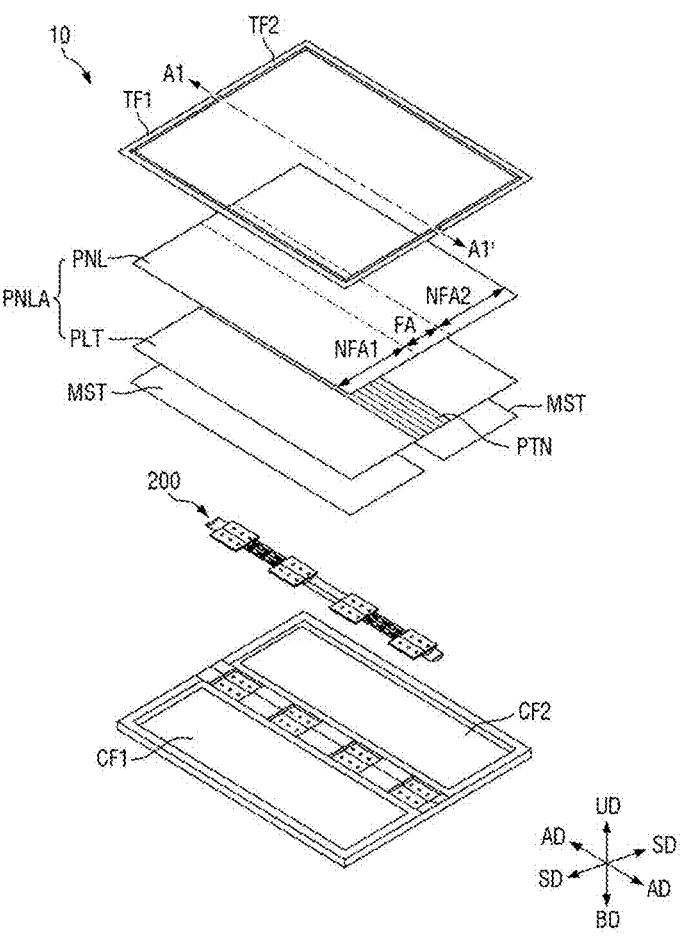
FIG. 3 is an exploded perspective view of the display device according to the first embodiment.

A top frame TF may be disposed on the front surface of the display device 10. The top frame TF may be disposed to cover an edge of the display panel PNL. The front surface of the display device 10 indicates a surface on which images are displayed by the display panel PNL. Since the display device 10 is folded with respect to the folding axis A1, the top frame TF may include two top frames TF1 and TF2 which are physically separated. With respect to the folding axis A1, the top frame TF includes the first top frame TF1 disposed at one side and the second top frame TF2 disposed at the other side. A height from the lower surface of the display device 10 to the top frame TF may be greater than or substantially the same as a height to the display panel PNL. Therefore, when viewed from the side surface, the display panel PNL may be invisible. The first top frame TF1 and the second top frame TF2 are shown in FIG. 3.

The side and back surfaces of the display device 10 may be covered by the cover frame CF. The back surface of the display device 10 indicates a surface opposite to the front surface, and the side surface indicates a surface between the front and back surfaces. Since the display device 10 is folded with respect to the folding axis A1, the cover frame CF may include two cover frames CF1 and CF2 which are physically separated. With respect to the folding axis A1, the cover frame CF includes the first cover frame CF1 disposed at one side and the second cover frame CF2 disposed at the other side. The first cover frame CF1 and the second cover frame CF2 are shown in FIG. 3.

The hinge assembly 200 is disposed close to the rear surface of the display device 10 and disposed along the folding axis A1. The hinge assembly 200 may be arranged to be covered by the cover frames CF1 and CF2 in the unfolded state. In the unfolded state, the hinge assembly 200 of the display device 10 may be disposed to be invisible from the outside. Alternatively, in the unfolded state, the hinge assembly 200 of the display device 10 may be disposed so that only a minimum portion is visible from the outside.

Although not shown, a camera module for capturing images may be disposed on the front, back, and/or side surfaces of the display device 10. In addition, buttons for controlling functions of the display device 10 or components for performing the functions may be disposed on the front, back, and/or side surfaces of the display device. For example, a volume button, a power button, a mode change button, a speaker, a microphone, an antenna, a flash, and the like may be disposed.

Although not shown, the display device 10 may include sensors for sensing an operation state or an external environment. For example, the display device 10 may include a gesture sensor, a grip sensor, a color sensor, an infrared sensor, an illumination sensor, an ultrasonic sensor, an iris recognition sensor, a distance detection sensor, a light detection and ranging (LiDAR) sensor, and the like.

Although not shown, the display device 10 may include connectors for receiving signals from the outside. For example, the display device 10 may include a charging connector, a USB connector, an earphone jack connector, and the like.

Referring to FIG. 2, when the display device 10 is folded, the display panel PNL is folded so that the first unfolding area NFA1 and the second unfolding area NFA2 face each other with respect to the folding axis A1. The hinge assembly 200 may be exposed to the outside as the cover frames CF1 and CF2 are folded by rotating.

In the folded state, the display panel PNL is invisible from the outside. Only the cover frames CF1 and CF2 and the hinge assembly 200 of the display device 10 are visible from the outside.

According to various embodiments, the cover frames CF1 and CF2 are not limited to the shapes and coupling shown in FIGS. 1 and 2 and can be implemented by other shapes or coupling of components. According to one embodiment, the first cover frame CF1 and the second cover frame CF2 may be disposed at both sides with respect to the folding axis A1 and may have overall symmetrical shapes with respect to the folding axis A1. According to some embodiments, the first cover frame CF1 and the second cover frame CF2 may be asymmetrically disposed and may have an asymmetric shape with respect to the folding axis A1. According to some embodiments, an angle or distance formed between the first cover frame CF1 and the second cover frame CF2 may be changed depending on the folded state, unfolded state, or intermediate state of the display device 10. According to one embodiment, each of the first cover frame CF1 and the second cover frame CF2 may have a shape which is physically separated into a frame for covering only the back surface and a frame for covering only the side surface of the display device 10.

According to various embodiments, the first cover frame CF1 and the second cover frame CF2 may form an internal accommodation space through their structural coupling. The hinge assembly 200 and the display panel PNL may be accommodated in the internal accommodation space.

According to various embodiments, components for driving the display device 10 may be disposed in the internal accommodation space. For example, a battery, a control printed circuit board, a flat cable, a flexible printed circuit board, and the like may be disposed in the internal accommodation space.

According to various embodiments, a size of a portion of the hinge assembly 200 exposed to the outside may be changed depending on a folding angle of the display device 10. For example, when the display device 10 is in a folded state, a large portion of the hinge assembly 200 may be exposed between the first cover frame CF1 and the second cover frame CF2. When the display device 10 is in an unfolded state, the hinge assembly 200 may be substantially covered by the first cover frame CF1 and the second cover frame CF2. When the display device 10 is in an intermediate state between the folded state and the unfolded state, a relatively small portion of the hinge assembly 200 may be exposed between the first cover frame CF1 and the second cover frame CF2.

According to various embodiments, when the display device 10 is in the unfolded state, the angle formed between the first cover frame CF1 and the second cover frame CF2 may be 180 degrees. Therefore, an angle formed between the first unfolding area NFA1 and the second unfolding area NFA2 may be 180 degrees. Therefore, the display panel PNL may become a completely flat state.

According to various embodiments, when the display device 10 is in the intermediate state between the folded state and the unfolded state, folding may be stopped at the folding angle. This can be referred to as a so-called free stop.

According to various embodiments, the cover frame CF and the top frame TF may be made of glass or polymer. The cover frame CF and the top frame TF may be transparent or opaque. For example, the cover frame CF and the top frame TF may be made of coated or colored glass, ceramic, polymer, aluminum, stainless steel, magnesium, or a combination thereof.

Figure 4:
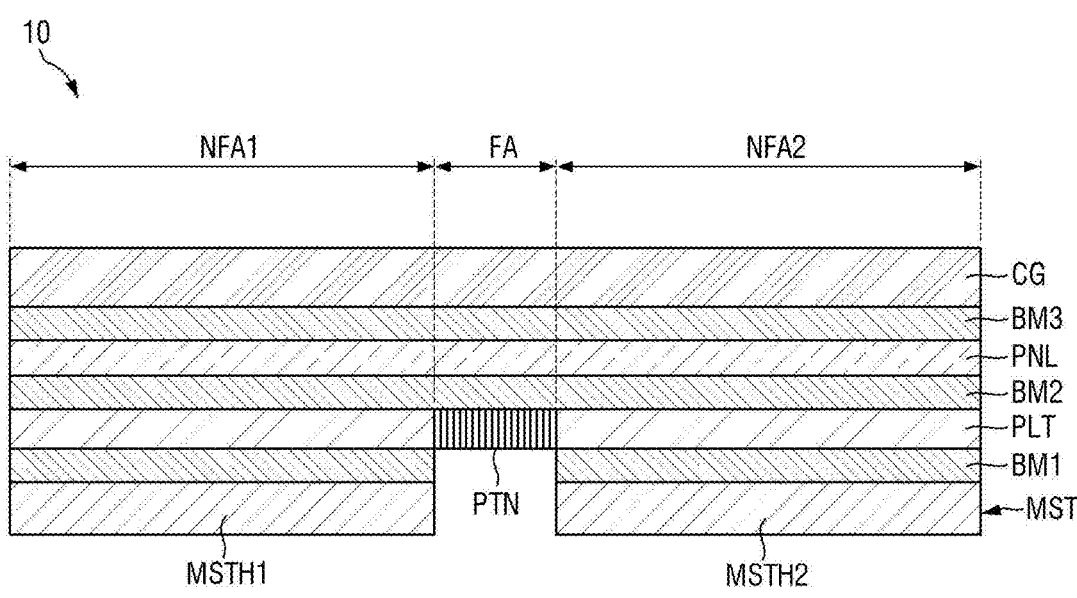
FIG. 4 is a cross-sectional view of the display device according to the first embodiment.
Figure 5:
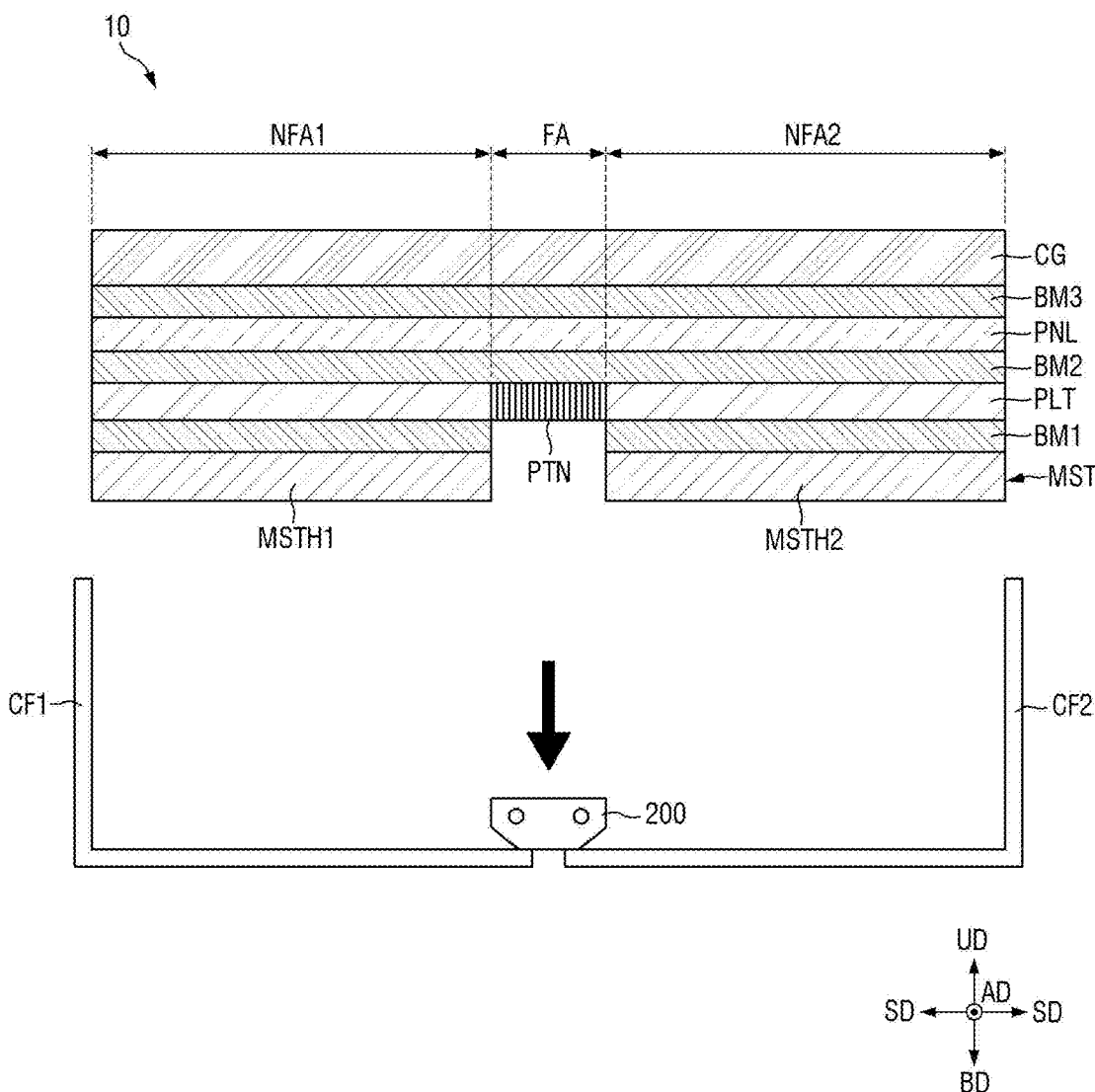
FIG. 5 is a schematic view showing a middle plate, a plate, a display panel, and a cover member of the display device shown in FIG. 4, which are fastened to a hinge assembly according to the first embodiment.

FIG. 3 is an exploded perspective view of the display device according to the first embodiment. FIG. 4 is a cross-sectional view of the display device according to the first embodiment. FIG. 5 is a schematic view showing a middle plate, a plate, a display panel, and a cover member of the display device shown in FIG. 4, which are fastened to a hinge assembly.

Referring to FIGS. 3 to 5, in the present specification, a direction along the folding axis A1 in which the display device 10 is folded is defined as an axial direction AD. A direction starting from the first unfolding area NFA1 of the display device 10, passing through the folding area FA, and reaching the second unfolding area NFA2 is defined as a side direction SD. A direction in which the display panel PNL of the display device 10 is directed is defined as an upper direction UD. A direction opposite to the upper direction UD is defined as a bottom direction BD.

A top frame TF is disposed on the uppermost portion of the display device 10 in the upper direction UD. With respect to the folding axis A1, the top frame TF includes the first top frame TF1 disposed at one side and the second top frame TF2 disposed at the other side. The top frame TF may be disposed to cover the edge of the display panel PNL. The top frame TF may protect the display panel PNL from an external impact. The top frame TFT may form a bezel of the display device 10.

A cover member CG may be disposed under the top frame TF. The cover member CG may be disposed above the display panel PNL. The cover member CG may be made of glass or a glass material including quartz or the like. However, the cover member CG is not limited thereto and may be made of a plastic material.

The cover member CG may be disposed above the display panel 100 to protect members disposed under the cover member CG from the outside. Meanwhile, since the display device 10 functions as a display device, the cover member CG should have flexibility. To this end, the cover member CG preferably has a modulus of 70 GPa or less and also preferably has a thickness of about 100 μm or less. However, when the thickness of the cover member CG is too small, the cover member CG cannot function to protect the members disposed under the cover member CG, and thus the cover member CG preferably has a thickness of at least about 20 um or more. The cover member CG may be a cover layer formed by chemical reinforcement.

Meanwhile, although the cover member CG functions to protect the members disposed under the cover member CG from the outside, as described above, since the cover member CG is made of a glass material, the cover member CG may be destroyed by an external force to generate glass fragments, and the glass fragments may scatter to the outside of the display device 10. To prevent or at least reduce the scattering of the glass fragments due to the destruction of the cover member CG, a film layer, a hard coating layer, and the like may be further disposed above the cover member CG.

A panel assembly PNLA is disposed under the cover member CG. The panel assembly PNLA includes the display panel PNL and a plate PLT. The display panel PNL may include a flexible substrate, a circuit element layer disposed on the flexible substrate and including transistors, a light emitting layer disposed on the circuit element layer and including a light emitting element, an encapsulation layer disposed on the light emitting layer, a touch layer disposed on the encapsulation layer or disposed inside the encapsulation layer, a polarizer for reducing reflected visibility from the front surface of the display panel, a cover glass disposed above the touch layer, and the like. The display panel PNL may include the first unfolded area NFA1, the folded area FA, and the second unfolded area NFA2.

The plate PLT may be disposed under the display panel PNL and may include various plates for supporting the display panel PNL. For example, one or more plates may include a back plate for supporting the display panel PNL, a top plate disposed under the back plate and made of a stainless steel (SUS) material, a bottom plate disposed under the top plate, having a pattern formed on a folding portion thereof, and made of a SUS material, a heat dissipation sheet which functions as heat dissipation, a middle plate for covering a plane which is uneven due to various components of the hinge assembly.

As shown in FIGS. 3 to 5, a slit pattern PTN may be formed in the plate PLT. The slit pattern PTN may be formed at a position corresponding to the folding area FA of the display panel PNL. The slit pattern PTN may be a slit-shaped etched portion formed in the plate PLT. For example, the plate PLT may be made of a metal such as a SUS material, but the strong nature of the metal may cause problems in folding or unfolding the plate PLT. The slit pattern PTN may supplement the flexibility of the plate PLT. A representative example of the plate PLT shown in FIG. 3 may be a bottom plate.

A middle plate MST is disposed under the panel assembly PNLA. The middle plate MST supports components disposed there above in the upper direction UD. In addition, the hinge assembly 200 and the cover frame CF are disposed in the bottom direction BD of the middle plate MST, and their upper surfaces may be uneven. The middle plate MST may flatten a non-flattened lower surface. The middle plate MST may be made of a material such as plastic, polyimide, or metal to increase the rigidity of the display device 10. For example, the middle plate MST may include aluminum or SUS, but is not limited thereto. The middle plate MST may be provided as a pair of middle plates MST.

The middle plate MST may include a first middle plate portion MSTH1 disposed in the first unfolding area NFA1, and a second middle plate portion MSTH2 disposed in the second unfolding area NFA2.

The hinge assembly 200 is disposed under the panel assembly PNLA. The hinge assembly 200 is disposed under the folding area FA. The hinge assembly 200 may have a shape extending in the axial direction AD. The hinge assembly 200 may perform a folding motion in which one side and the other side rotate about the folding axis A1. Detailed description of the hinge assembly 200 will be made below with reference to FIG. 5 and the like.

The cover frame CF is disposed under the hinge assembly 200. An accommodation groove in which a portion of the hinge assembly 200 may be seated may be formed in an upper surface of the cover frame CF. With respect to the folding axis A1, the cover frame CF includes the first cover frame CF1 disposed at one side and the second cover frame CF2 disposed at the other side. The cover frame CF may be a housing for defining the side and back surfaces of the display device 10. The cover frame CF may protect the display device 10 from an external impact. The cover frame CF may be coupled to the hinge assembly 200. Folding and unfolding of the display device 10 can be implemented according to the rotation of the cover frames CF1 and CF2.

Coupling members BM1, BM2, and BM3 for coupling the adjacent members MST, PLT, PNL, and CG may be further disposed between the adjacent members. In each of the unfolded areas NFA1 and NFA2, the first coupling member BM1 may couple the middle plates portions MSTH1 and MSTH2 with the plate PLT disposed there above, the second coupling member BM2 may couple the plates PLT and PTN with the display panel PNL disposed there above, and the third coupling member BM3 may couple the display panel PNL with the cover member CG.

As shown in FIG. 5, the plate PLT, the middle plate MST, and the middle plate MST, which are coupled, may be seated on the cover frames CF1 and CF2. The display device 10 may perform folding and unfolding operations by the hinge assembly 200 disposed on the cover frames CF1 and CF2.

Hereinafter, a specific structure and function of the hinge assembly 200 including a hinge support 250 will be described in detail with reference to FIGS. 6 to 16.

Figure 6:
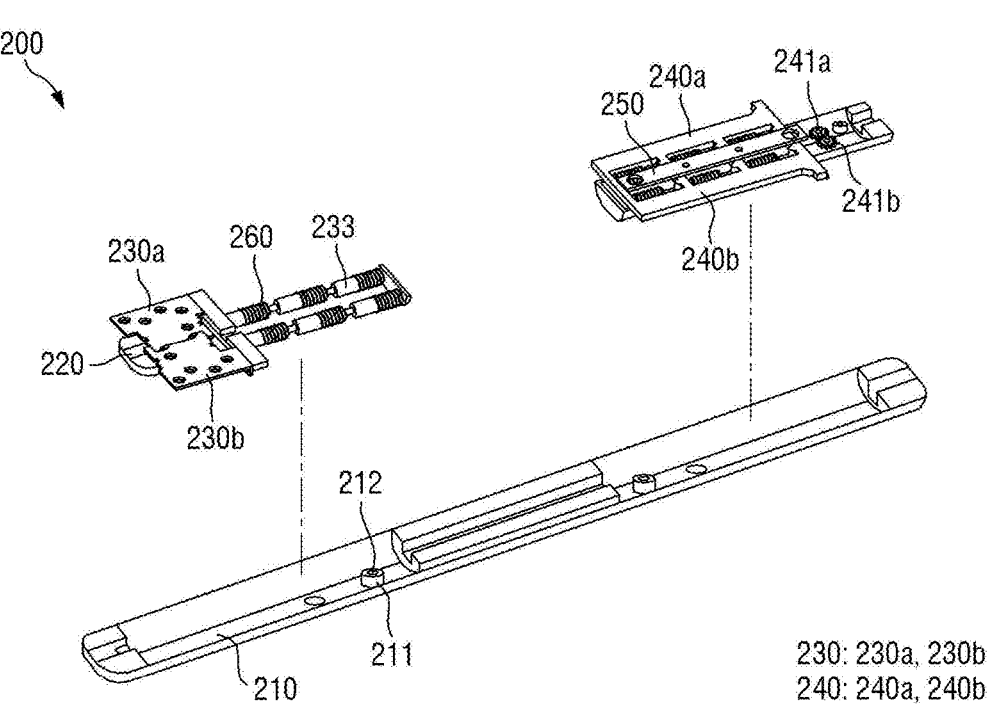
FIG. 6 is an exploded perspective view of the hinge assembly according to the first embodiment.
Figure 6:
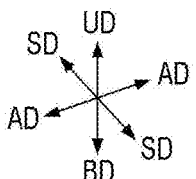
Figure 7:
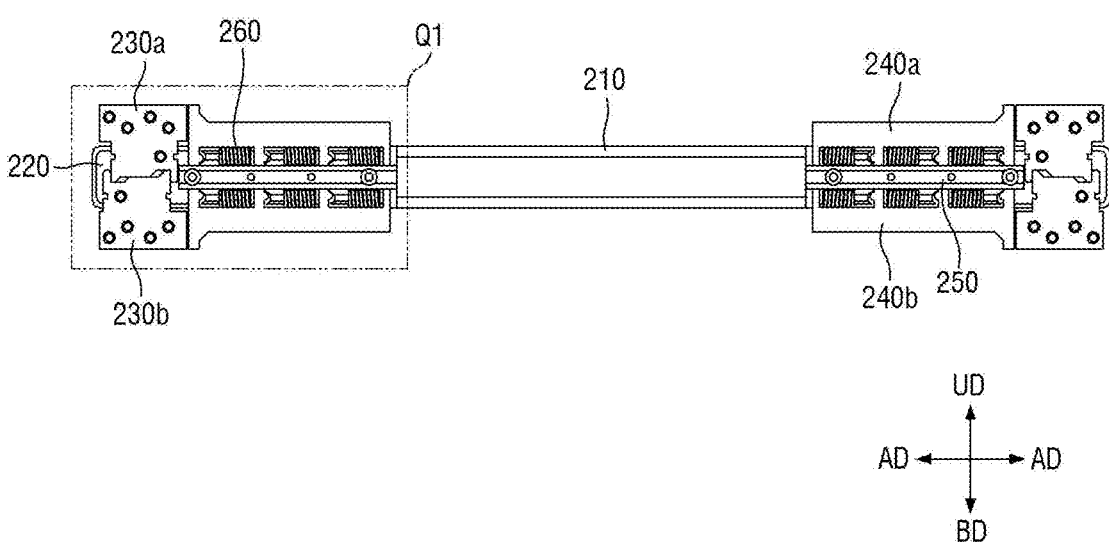
FIG. 7 is a perspective view of the hinge assembly according to the first embodiment.
Figure 8:
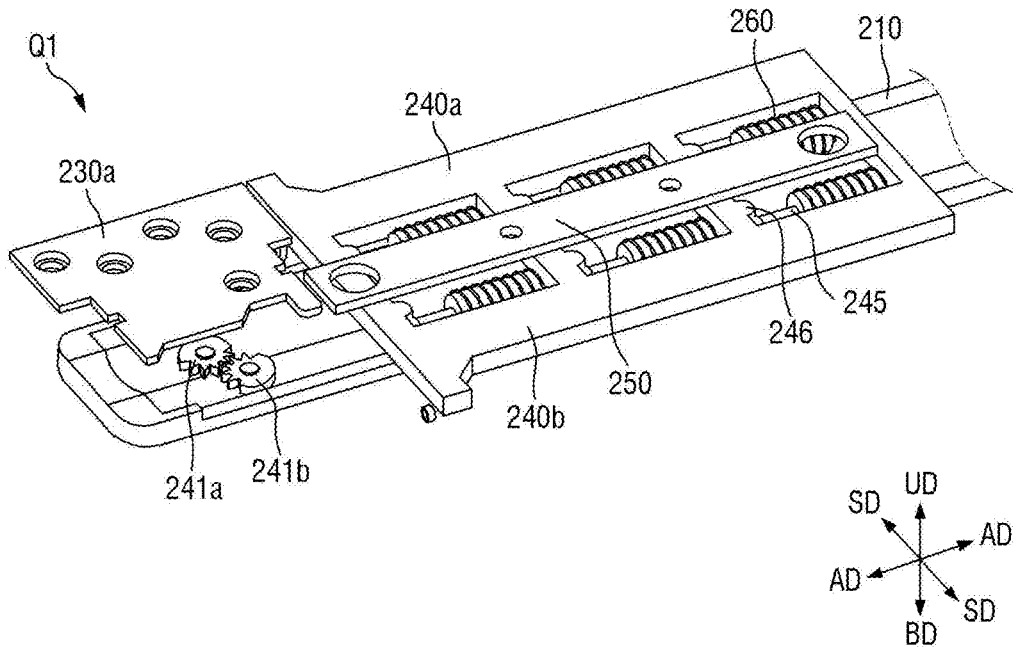
FIG. 8 is an enlarged view of portion A in FIG. 7 according to the first embodiment.
Figure 9:
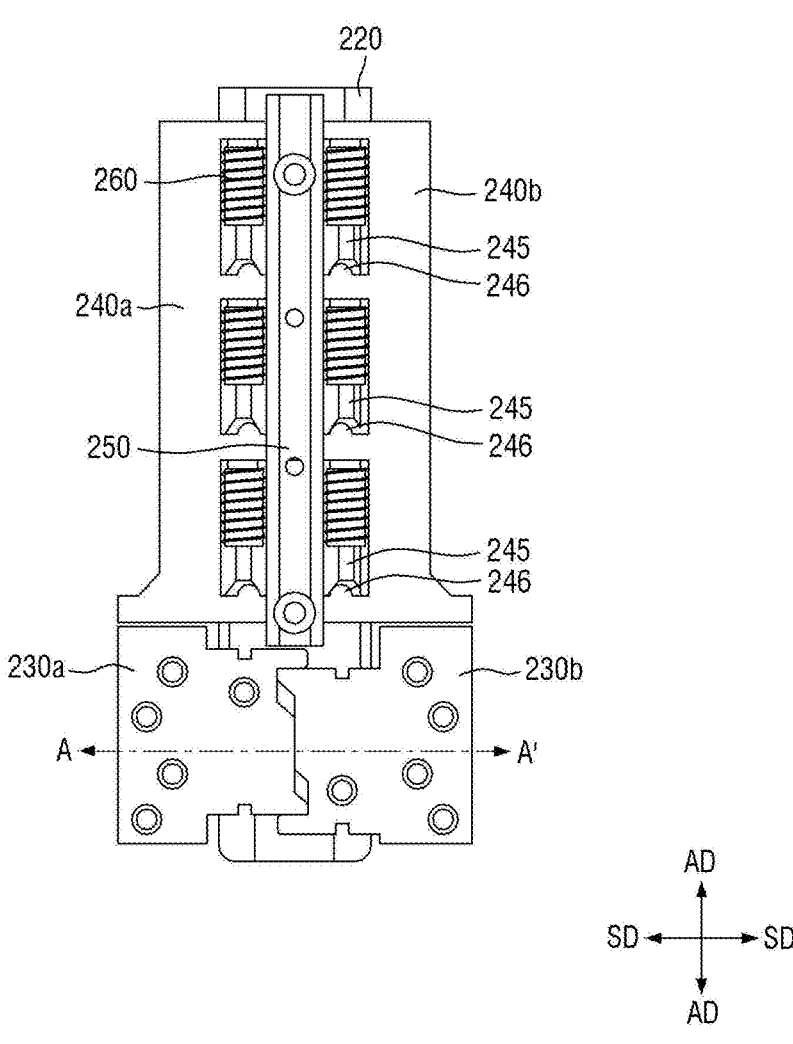
FIG. 9 is a plan view of the hinge assembly according to the first embodiment.
Figure 10:
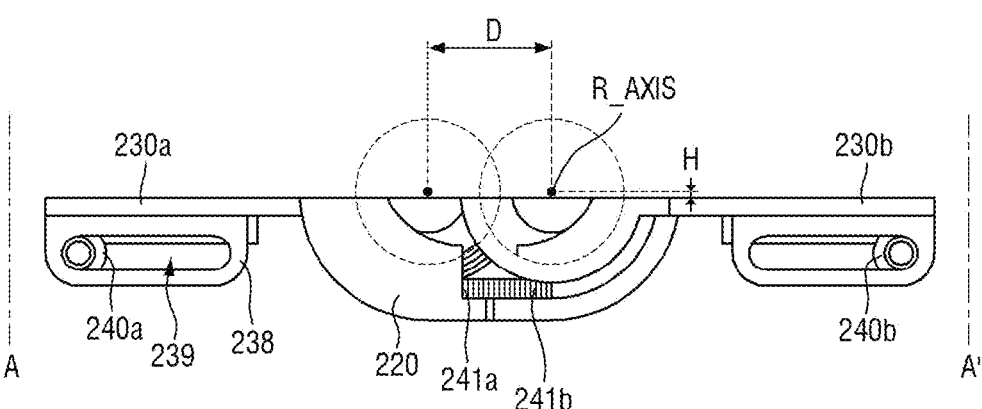
FIG. 10 is a cross-sectional view along line A-A' in FIG. 9 according to the first embodiment.

FIG. 6 is an exploded perspective view of the hinge assembly according to the first embodiment. FIG. 7 is a perspective view of the hinge assembly according to the first embodiment. FIG. 8 is an enlarged view of portion A in FIG. 7. FIG. 9 is a plan view of the hinge assembly according to the first embodiment. FIG. 10 is a cross-sectional view along line A-A' in FIG. 9. In FIG. 6, a gear arm 240 is omitted at an upper left portion, and a hinge arm 230 is omitted at an upper right portion to show internal components. In FIG. 8, a second hinge arm 230b is omitted to show a pair of bevel gears 241a and 241b.

Referring to FIGS. 6 to 10, the hinge assembly 200 according to the first embodiment may include a hinge housing 210, a pair of hinge arms 230, and an inner frame 220.

In addition, although not shown, the hinge assembly 200 of the first embodiment may further include a hinge arm upper cover and a hinge arm lower cover fastened to upper and lower portions of the hinge arm 230, respectively, but is not limited thereto. The hinge assembly 200 may have the pair of hinge arms 230 provided at one side thereof, and the pair of hinge arms 230 may be connected rotatably. In other words, the hinge arm 230 may include a first hinge arm 230a and a second hinge arm 230b which have symmetrical structures, but are not limited thereto. The first hinge arm 230a and the second hinge arm 230b may have symmetrical structures.

The hinge arm 230 according to the first embodiment has a two-axis folding (rotation) structure. In other words, when a folding hinge is implemented using a 4-axis gear, it is not possible to manufacture a thin set, or there may be a problem with durability as a size of the gear is reduced to implement a small thickness. Therefore, the present disclosure is characterized by a display device 10 (see FIG. 1) with a new hinge structure for forming a folding trajectory (marked by a dotted line in FIG. 10) based on the two-axis rotation structure. In other words, the display device according to the first embodiment is characterized by the display device 10 (see FIG. 1) with a two-axis folding hinge structure which may be folded in an inner direction. In addition, the first embodiment is characterized by the display device 10 with a new hinge structure having two bevel gears 241 and a link slider structure for synchronization between axes upon two-axis rotation. The hinge arm 230 is a two-axis folding lever and may also be referred to as a lever wing.

The bevel gear 241 may be a gear for synchronizing the two-axis folding hinge arm 230. Therefore, the bevel gear 241 may also be referred to as a sink gear.

The bevel gear 241 may include a first bevel gear 241a coupled to the first hinge arm 230a and a second bevel gear 241b coupled to the second hinge arm 230b.

The first bevel gear 241a and the second bevel gear 241b may have a virtual axis different from a rotation axis R_AXIS, which is an actual axis. In other words, the first bevel gear 241a and the second bevel gear 241b may have a virtual axis substantially perpendicular to the rotation axis R_AXIS.

Each of first and second tooth form portions formed on the first bevel gear 241a and the second bevel gear 241b may be formed on only a portion of a circumference thereof, but is not limited thereto.

The first bevel gear 241a and the second bevel gear 241b may be disposed to be engaged. However, the first bevel gear 241a and the second bevel gear 241b are not limited thereto, and the first bevel gear 241a and the second bevel gear 241b may be engaged with a first rotation gear and a second rotation gear, respectively and configured so that the first rotation gear and the second rotation gear are engaged.

Left and right synchronization can be maintained through two sync gears 241, that is, the first bevel gear 241a and the second bevel gear 241b.

The first bevel gear 241a and the second bevel gear 241b may include a second idle gear engaged with a first idle gear of each of the first hinge arm 230a and the second hinge arm 230b to change and transmit the rotation of each of the first hinge arm 230a and the second hinge arm 230b in a vertical direction.

In this case, the first idle gear and the second idle gear may be disposed in a substantially vertical direction to change rotation in the vertical direction. In other words, while each of the first bevel gear 241a and the second bevel gear 241b may be rotatably fastened to the first idle gear of each of the first hinge arm 230a and the second hinge arm 230b through the second idle gear, each of the first hinge arm 230a and the second hinge arm 230b may be slidably fastened to the first gear arm 240a and the second gear arm 240b to perform the folding and unfolding operations of the display device 10 while maintaining the left and right synchronization.

Sliding pins 242 protruding toward the first hinge arm 230a and the second hinge arm 230b may be provided at ends of the first gear arm 240a and the second gear arm 240b, and sliding spaces 239 in which the sliding pins 242 may move may be provided on protrusions 238 of the first hinge arm 230a and the second hinge arm 230b facing the first gear arm 240a and the second gear arm 240b. Therefore, upon the folding or unfolding operation of the display device 10, the sliding pin 242 may move in the sliding space 239, and the first gear arm 240a and the second gear arm 240b may rotate in conjunction with the rotation of the first hinge arm 230a and the second hinge arm 230b. Detailed description thereof will be made below with reference to FIGS. 13 to 16.

Meanwhile, the gear arm 240 may be rotatably fastened to a shaft 233.

The gear arm 240 is a two-axis folding detent and may also be referred to as a lever detent.

In other words, the gear arm 240 may include the first gear arm 240a and the second gear arm 240b, and the first hinge arm 230a and the second hinge arm 230b may be fastened to the first gear arm 240a and the second gear arm 240b, respectively, to be interworked with the first gear arm 240a and the second gear arm 240b.

The gear arm 240 may have a link structure connected to the two-axis hinge arm 230. In other words, the first gear arm 240a and the second gear arm 240b may be connected to the first hinge arm 230a and the second hinge arm 230b, respectively. Therefore, upon the folding or unfolding operation of the display device 10, the first hinge arm 230a and the second hinge arm 230b may be rotated together according to the rotation of the first gear arm 240a and the second gear arm 240b, and the left and right synchronization can be maintained by the first bevel gear 241a and the second bevel gear 241b connected to the first hinge arm 230a and the second hinge arm 230b, respectively.

As described above, the first hinge arm 230a and the second hinge arm 230b may be interworked with the first gear arm 240a and the second gear arm 240b, respectively.

The shaft 233 may constitute a frame for seating and assembling a cam 245.

A compression spring 260 for generating a frictional force of the cam 245 may be provided on an outer surface of the shaft 233 between the gear arm 240 and the cam 245.

The gear arm 240 fastened to the outer surface of the shaft 233 may include a plurality of cams 245 and second detents 246 for maintaining angles of the folding and unfolding of the hinge arm 230 and the gear arm 240. Therefore, the cam 245 may be a component for torques of the folding and unfolding the hinge arm 230. The cam 245 may be referred to as a slide cam.

Meanwhile, a predetermined hinge housing 210 for accommodating the inner frame 220, the hinge arm 230, and the gear arm 240 may be provided under the hinge assembly 200.

The hinge housing 210, an exterior cover of the hinge assembly 200, may have a predetermined length, and have a space provided therein to accommodate the inner frame 220, the hinge arm 230, and the gear arm 240 in the space. The hinge housing 210 may be referred to as a hinge cover.

The inner frame 220 may be a frame for fixing an interior of the hinge assembly 200. The inner frame 220 may be provided with a plurality of fastening grooves (not shown) and through grooves (not shown). The inner frame 220 is an exterior cover for accommodating the pair of first and second bevel gears 241a and 241b and may be referred to as a housing cover.

In addition, a fixing member 211 facing the fastening groove of the inner frame 220 may be formed in the hinge housing 210, and a fixing groove (or a fixing hole) 212 may be formed in the fixing member 211 and fixedly fastened to the fastening groove through a fastening member such as a screw.

The hinge housing 210 may have a predetermined size, and the inner frame 220, the hinge arm 230, and the gear arm 240 may be accommodated in the space of the hinge housing 210.

Meanwhile, a distance between rotation centers of the pair of shafts 233 may be greater than a distance D between the rotation axes R_AXIS, which are the rotation centers of the pair of hinge arms 230.

In this case, a pair of virtual axes passing through the centers of the pair of shafts 233 may function as the center axes to which components constituting the hinge housing 210 are coupled. A pair of virtual axes may be provided and each may correspond to the first cover 110 and the second cover 120.

An axis height H may be present between the folding portion in which the first hinge arm 230a and the second hinge arm 230b are in contact with the display panel 180 and the rotation axis R_AXIS, but the present disclosure is not limited thereto.

Meanwhile, as described above, in the first embodiment, a "T"-shaped hinge support 250 is disposed between the first gear arm 240a and the second gear arm 240b of the hinge assembly 200. Through the up/down method of the hinge support 250, it is possible to secure an escape structure for implementing the curvature of the display panel 180 when folded and at the same time, improve impact proof characteristics by supporting the first gear arm 240a and the second gear arm 240b.

The hinge support 250 may be disposed in the inner frame 220 between the first gear arm 240a and the second gear arm 240b in a longitudinal direction of the inner frame 220.

The hinge support 250 may have a "T" shape having an upper end protruding in a direction perpendicular to the longitudinal direction.

The hinge support 250 may have an empty space therein, but is not limited thereto.

Meanwhile, as described above, the present disclosure is characterized by having a link slider structure as well as the two bevel gears 241a and 241b for synchronization between axes upon two-axis rotation, which will be described in detail with reference to FIGS. 10 to 16.

Figure 11:
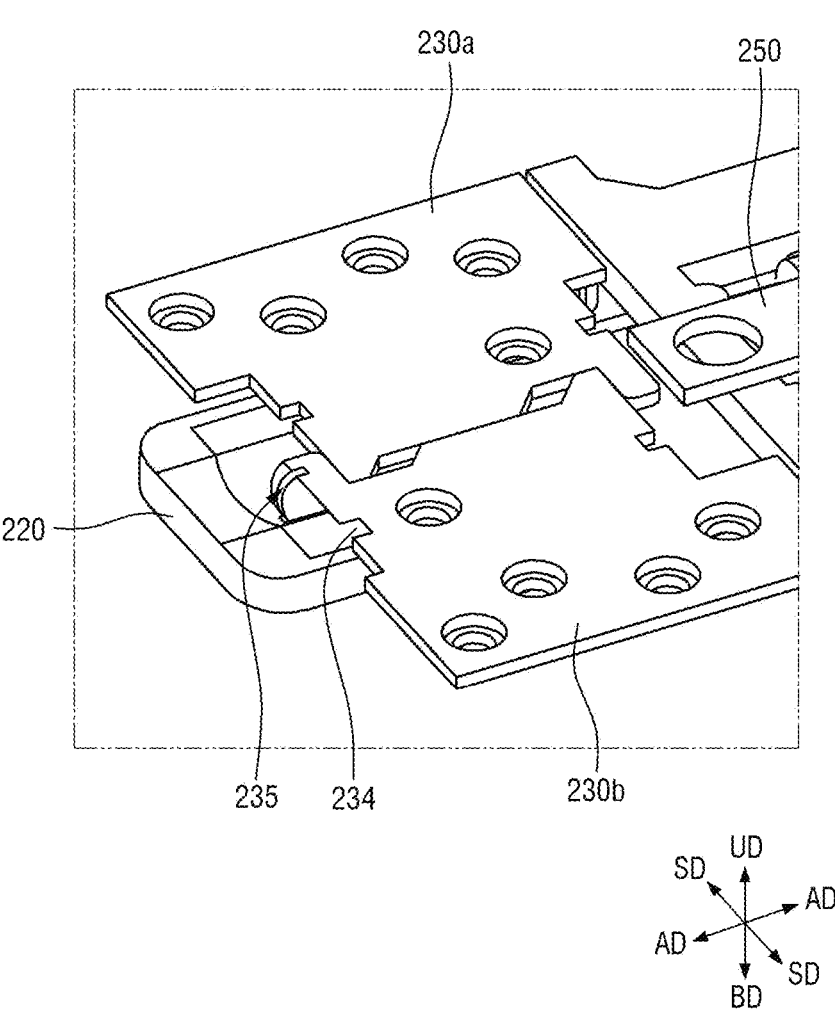
FIG. 11 is a perspective view showing an unfolded state of the hinge assembly according to some embodiments.
Figure 12:
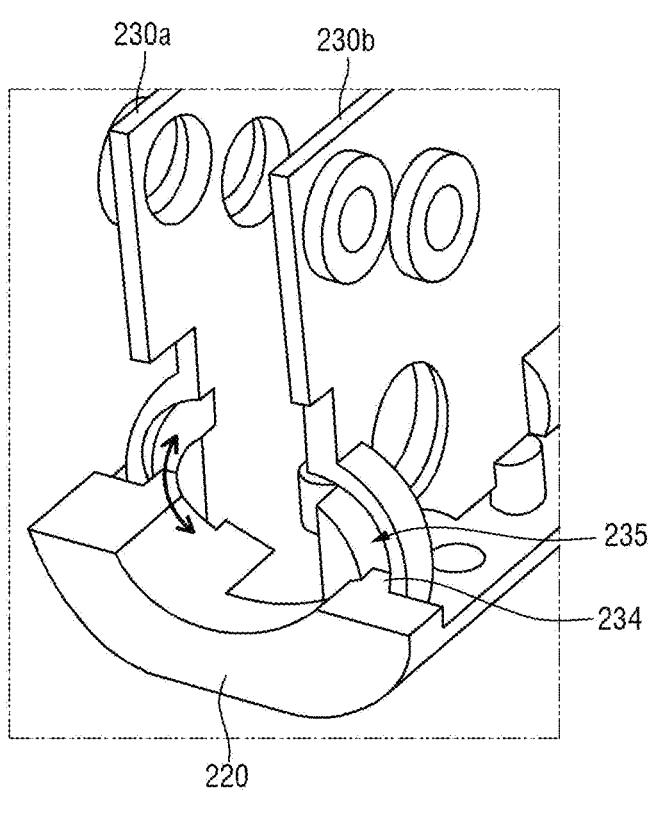
FIG. 12 is a perspective view showing a folded state of the hinge assembly according to some embodiments.
Figure 13:
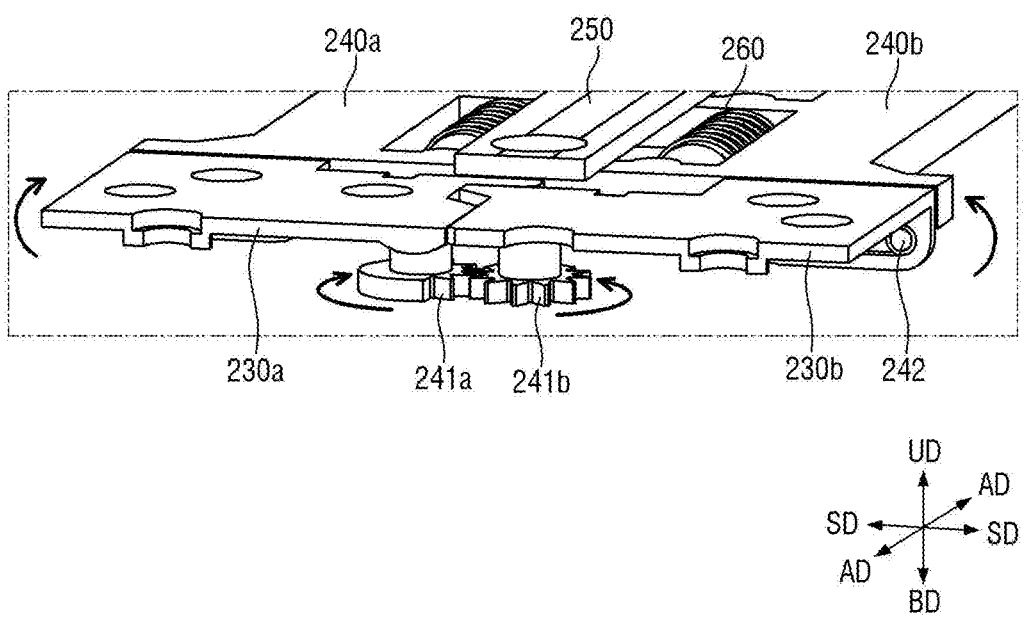
FIG. 13 is another perspective view showing the unfolded state of the hinge assembly according to some embodiments.
Figure 14:
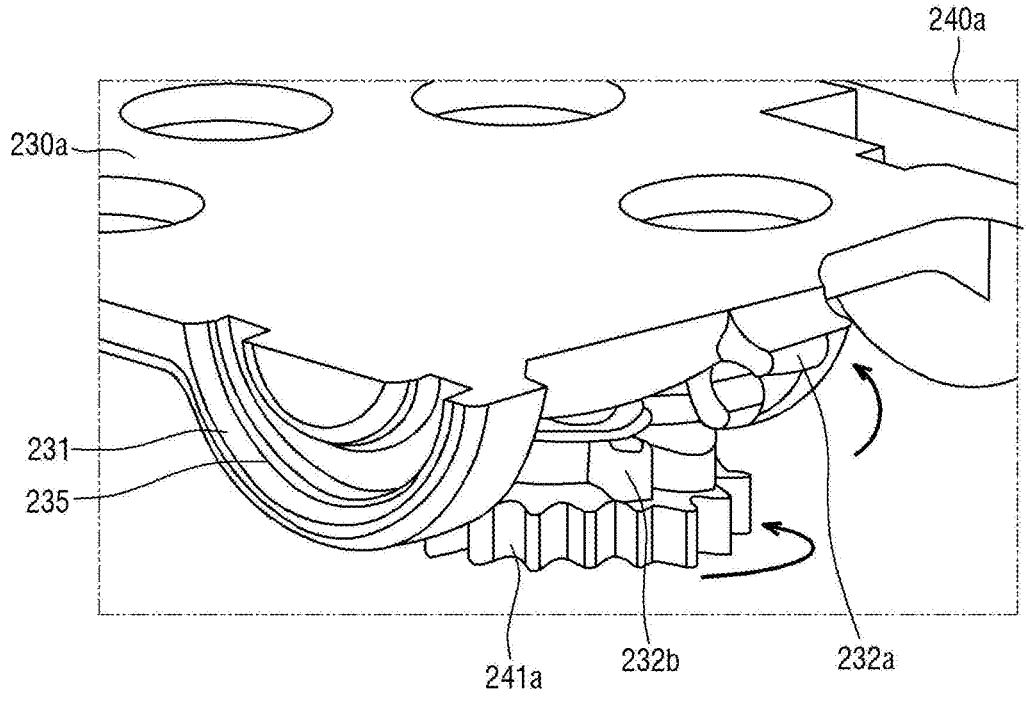
FIG. 14 is an enlarged view of a portion of the hinge assembly in FIG. 13 according to some embodiments.
Figure 15:
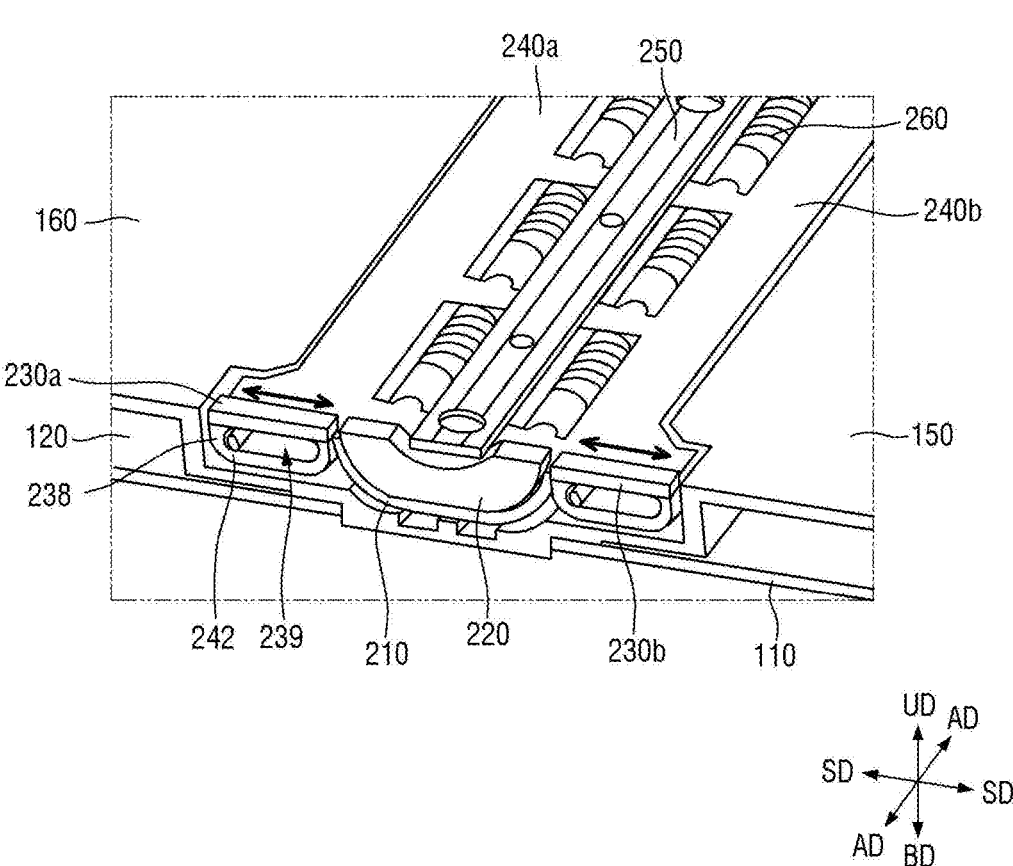
FIG. 15 is a cutout perspective view showing an unfolded state of the display device according to the first embodiment.
Figure 16:
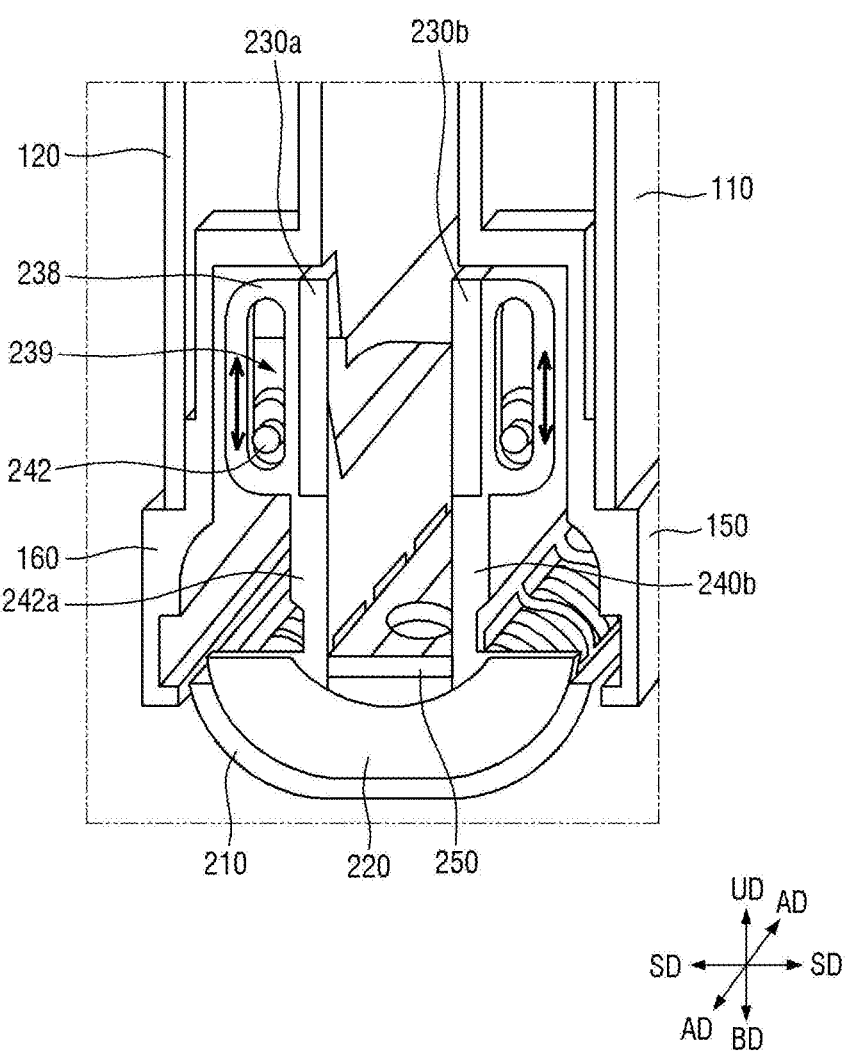
FIG. 16 is a cutout perspective view of a folded state of the display device according to the first embodiment.

FIG. 11 is a perspective view showing an unfolded state of the hinge assembly. FIG. 12 is a perspective view showing a folded state of the hinge assembly. FIG. 13 is another perspective view showing the unfolded state of the hinge assembly. FIG. 14 is an enlarged view of a portion of the hinge assembly in FIG. 13. FIG. 15 is a cutout perspective view showing an unfolded state of the display device according to the first embodiment. FIG. 16 is a cutout perspective view of a folded state of the display device according to the first embodiment.

FIGS. 11 to 14 show some components of the hinge assembly with the hinge housing removed for convenience of description.

FIGS. 15 and 16 respectively show a specific unfolded state and folded state of the display device with the display panel and the bezel cover omitted for convenience of description.

Referring to FIGS. 11, 12, 15, and 16, a set housing 110 may be disposed under the hinge assembly and set frames.

In some embodiments, the set frames may include a first support plate 150 at the left side, a second support plate 160 at the right side, a first frame at the left side, and a second frame at the right side, but are not limited thereto.

The first support plate 150 and the second support plate 160 may be separately provided to be folded independently of each other, and the hinge assembly may be provided therebetween.

The display device according to the first embodiment can be implemented in an in-folding manner in which a screen portion is disposed therein when folded.

In addition, the first support plate 150 and the second support plate 160 of the first embodiment may be disposed in one area and the other area where the folding and unfolding of the display device are performed.

The hinge assembly may include the hinge housing 210, the first and second hinge arms 230a and 230b, and the inner frame 220.

In addition, the hinge assembly of the first embodiment may further include a hinge arm upper cover and a hinge arm lower cover which are fastened to the upper and lower portions of the first and second hinge arms 230a and 230b, but is not limited thereto.

The hinge assembly may include the pair of hinge arms 230a and 230b, and the hinge arms 230a and 230b may include the first hinge arm 230a and the second hinge arm 230b which have symmetrical structures.

The first hinge arm 230a and the second hinge arm 230b according to the first embodiment have two-axis folding (rotation) structures.

In this case, the first hinge arm 230a and the second hinge arm 230b may be folded (rotated) along a folding trajectory (see an arrow in FIG. 12) of a housing cover rail 235.

In other words, a pair of guide pins 234 protruding toward the first hinge arm 230a and the second hinge arm 230b therein may be provided at the upper end of the inner frame 220, and a pair of housing cover rails 235 into which the pair of guide pins 234 are fitted may be provided on the first hinge arm 230a and the second hinge arm 230b facing the pair of guide pins 234. Therefore, the first hinge arm 230a and the second hinge arm 230b may be folded (rotated) along the folding trajectory of the housing cover rail 235 in a state of being guided by the pair of guide pins 234.

In addition, the first embodiment is characterized by having the two bevel gears 241a and 241b and the link slider structure for synchronization between axes upon two-axis rotation. It is possible to minimize or at least reduce a thickness of the display device using two bevel gears instead of four regular gears. In other words, in case of performing the left and right synchronization with four general gears, a thickness of the hinge assembly may be increased by thicknesses of the four gears disposed vertically. Therefore, according to the first embodiment, it is possible to reduce the thickness and weight of the hinge assembly by adjusting the left and right synchronization with the two bevel gears 241a and 241b. In addition, the folding of an R value smaller than a conventional value is possible.

Specifically, the bevel gear 241 may include the first bevel gear 241a coupled to the first hinge arm 230a and the second bevel gear 241b coupled to the second hinge arm 230b.

The first bevel gear 241a and the second bevel gear 241b may have a virtual axis different from a rotation axis R_AXIS, which is an actual axis. In other words, the first bevel gear 241a and the second bevel gear 241b may have a virtual axis substantially perpendicular to the rotation axis R_AXIS.

Each of first and second tooth form portions formed on the first bevel gear 241a and the second bevel gear 241b may be formed on only a portion of a circumference thereof, but is not limited thereto.

The first bevel gear 241a and the second bevel gear 241b may be disposed to be engaged. However, the first bevel gear 241a and the second bevel gear 241b are not limited thereto, and the first bevel gear 241a and the second bevel gear 241b may be engaged with a first rotation gear and a second rotation gear, respectively and configured so that the first rotation gear and the second rotation gear are engaged.

The first bevel gear 241a and the second bevel gear 241b may include a second idle gear 232b engaged with a first idle gear 232a of each of the first hinge arm 230a and the second hinge arm 230b to change and transmit the rotation of each of the first hinge arm 230a and the second hinge arm 230b in the vertical direction (see FIGS. 13 and 14).

In this case, the first idle gear 232a and the second idle gear 232b may be disposed in a substantially vertical direction to change rotation in the vertical direction. In other words, while each of the first bevel gear 241a and the second bevel gear 241b may be rotatably fastened to the first idle gear 232a of each of the first hinge arm 230a and the second hinge arm 230b through the second idle gear 232b, each of the first hinge arm 230a and the second hinge arm 230b may be slidably fastened to the first gear arm 240a and the second gear arm 240b to perform the folding and unfolding operations of the display device while maintaining the left and right synchronization.

In other words, when the first hinge arm 230a and the second hinge arm 230b are folded/unfolded in the vertical direction, the first bevel gear 241a and the second bevel gear 241b rotate in a horizontal direction to adjust synchronization.

Meanwhile, the rotation axes R_AXIS of the first hinge arm 230a and the second hinge arm 230b may differ from the pair of virtual axes B passing through the centers of the pair of shafts 233. In other words, the rotation axes R_AXIS about which the first hinge arm 230a and the second hinge arm 230b are folded/unfolded do not match the virtual axes B about which the first gear arm 240a and the second gear arm 240b are fold/unfold, and the rotation axes R_AXIS and the virtual axes B may be interworked by being connected in a link slide structure.

Therefore, the virtual axes B about which the first gear arm 240a and the second gear arm 240b are fold/unfold are the center axes of the shafts 233, and the rotation axes R_AXIS about which the first hinge arm 230a and the second hinge arm 230b are folded/unfolded are a center axis of the housing cover rail 235. The rotation axes R_AXIS and the virtual axes B may be connected in the link slide structure to interwork two different folding/unfolding axes.

In other words, in the first embodiment, while the first bevel gear 241a and the second bevel gear 241b are provided for synchronization between axes upon two-axis rotation, the first gear arm 240a and the second gear arm 240b are slidably fastened to the first hinge arm 230a and the second hinge arm 230b, respectively.

In other words, the sliding pins 242 protruding toward the first hinge arm 230a and the second hinge arm 230b may be provided at the ends of the first gear arm 240a and the second gear arm 240b, and the sliding spaces 239 in which the sliding pins 242 may move may be provided in the first hinge arm 230a and the second hinge arm 230b facing the first gear arm 240a and the second gear arm 240b. Therefore, upon the folding or unfolding operation of the display device, the sliding pin 242 may move in the sliding space 239, and the first gear arm 240a and the second gear arm 240b may be rotated (or folded/unfolded) in conjunction with the rotation (or folding/unfolding) of the first hinge arm 230a and the second hinge arm 230b. As described above, the two-axis hinge operation may be synchronized through the first bevel gear 241a and the second bevel gear 241b, and the link slider structure.

In this case, the sliding spaces 239 may be provided in the side protrusions 238 of the first hinge arm 230a and the second hinge arm 230b, but is not limited thereto.

Meanwhile, upon the folding and unfolding operations of the display device 10 (see FIG. 1), a holding force is implemented using a frictional force between the components constituting the hinge to maintain a specific folding angle of the display device.

In other words, the hinge assembly may be disposed in a portion in which the display device is folded and unfolded to allow the folding and unfolding operations of the display device to be performed easily. In addition, the hinge assembly may provide the holding force to maintain the folded state of the display device at a specific angle.

As described above, the display panel may be disposed on one surfaces of the first support plate 150 and the second support plate 160. The display panel may be one of various display panels such as an organic light emitting display panel and/or a liquid crystal display panel. In addition, the display panel may have flexibility to be folded and unfolded together when the display device is folded and unfolded.

The display device may be folded so that the first support plate 150 and the second support plate 160 form a specific folding angle. In other words, although FIG. 15 shows that the first support plate 150 and the second support plate 160 are fully unfolded, for example, at an angle of 180°, the display device may be folded at a specific angle. In other words, although FIG. 16 shows that the first support plate 150 and the second support plate 160 are folded, for example, at an angle of 90°, the present disclosure is not limited thereto. In this case, the display panel disposed above the first support plate 150 and the second support plate 160 may also be folded together when the first support plate 150 and the second support plate 160 are folded.

The display device may be folded at a specific angle according to the user's intention. In addition, the display device may be fully folded or unfolded according to the user's intention. The display device may be inner-folded (or in-folded) and folded or unfolded so that the display panel is disposed therein or out-folded and folded or unfolded so that the display panel is disposed outside.

The display device can maintain a specific folding angle by the holding force provided from the hinge assembly. In other words, the first support plate 150 and the second support plate 160 may be fixed in a state of maintaining a specific folding angle by the hinge assembly. Therefore, the display device may be folded at a specific angle according to the user's intention and can maintain a folded state at a specific angle by the holding force of the hinge assembly.

In particular, the present disclosure is characterized by maintaining the specific folding angle of the display device by applying a structure of the cam 245 including the compression spring 260 to implement holding torque and free stop functions.

Figure 17:
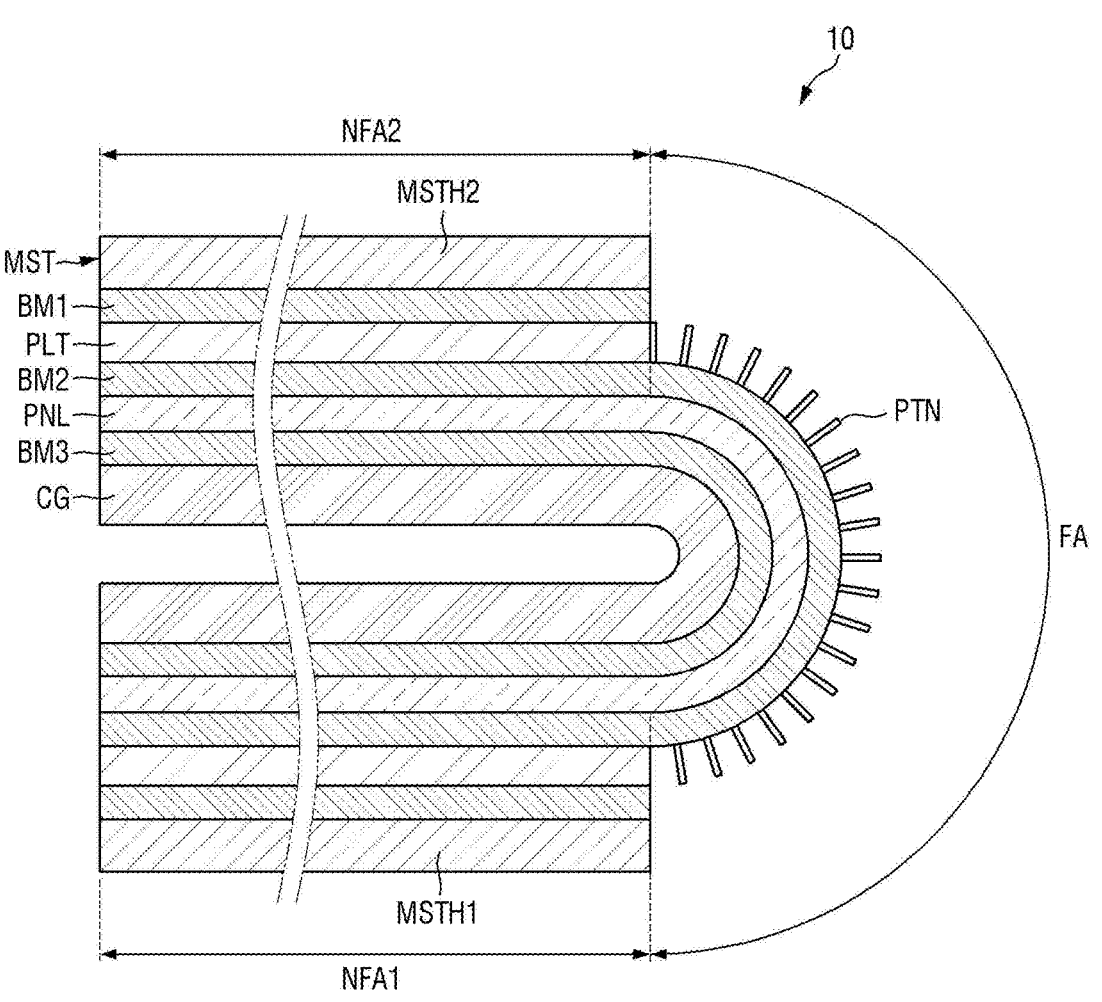
FIG. 17 is a cross-sectional view showing the folded state of the display device according to the first embodiment shown in FIG. 4.
Figure 18:
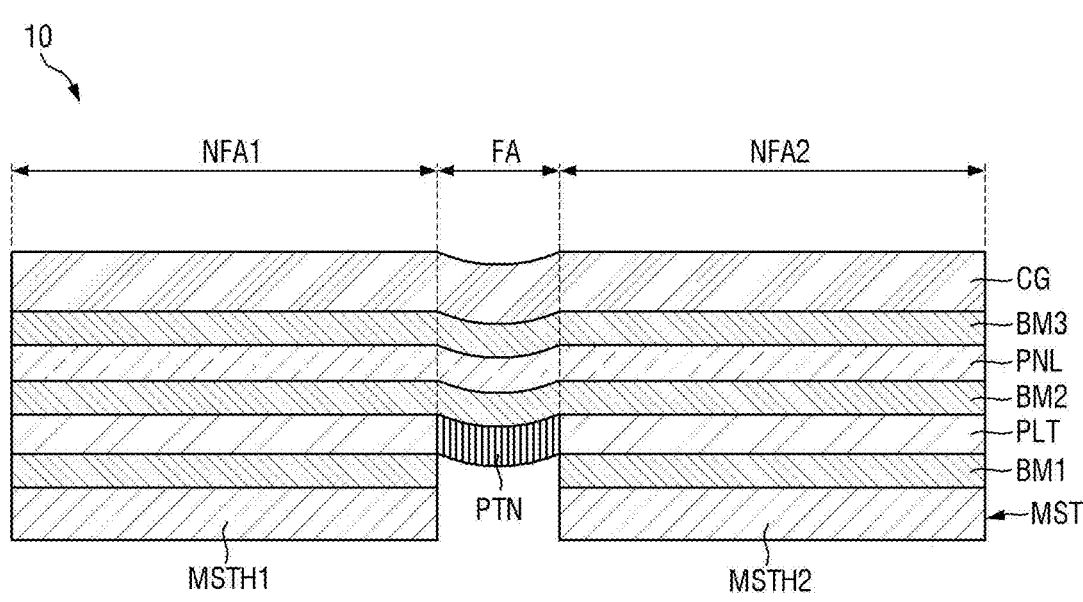
FIG. 18 is a cross-sectional view showing a modified example of the display device according to the first embodiment.

FIG. 17 is a cross-sectional view showing the folded state of the display device according to the first embodiment shown in FIG. 4. FIG. 18 is a cross-sectional view showing a modified example of the display device according to the first embodiment.

Referring to FIG. 17, the display panel PNL, the cover member CG, the plate PLT, and the middle plate MST may each be folded with respect to the folding area FA. The first middle plate portion MSTH1 and the second middle plate portion MSTH2 may overlap each other in the thickness direction. The slit pattern PTN may be disposed in the folding area FA.

Although the folding area FA has a flat shape as shown in FIG. 4 in the unfolded state of the display device 10, in the folded state, the folding area FA may be bent by being folded as shown in FIG. 17.

When the display device 10 repeats the folding/unfolding operations for a long time, deformation may occur in the folding area FA with large deformation.

Upon repeating the unfolding operation, the folding area FA may sag downward as shown in FIG. 18. More specifically, since the folding area FA has large deformation when repeating the folding/unfolding operations, the cover member CG, the display panel PNL, and the slit pattern PTN disposed in the folding area FA may each sage downward and may not be restored to original states. Even when the cover member CG, the display panel PNL, and the slit pattern PTN disposed in the folding area FA are restored, a restoration time may be a predetermined time or longer, and in this case, the sagged shape (or the wrinkle shape) may be visible from the outside, causing display defects. Since the cover member CG, the display panel PNL, and the slit pattern PTN disposed in the folding area FA do not have a separate member for supporting themself thereunder, degrees of sagging of the sagged shapes thereof may become severe over time.

The display device according to the second embodiment below is introduced to solve the sagging problem of the folding area FA of the display device according to the first embodiment.

Figure 19:
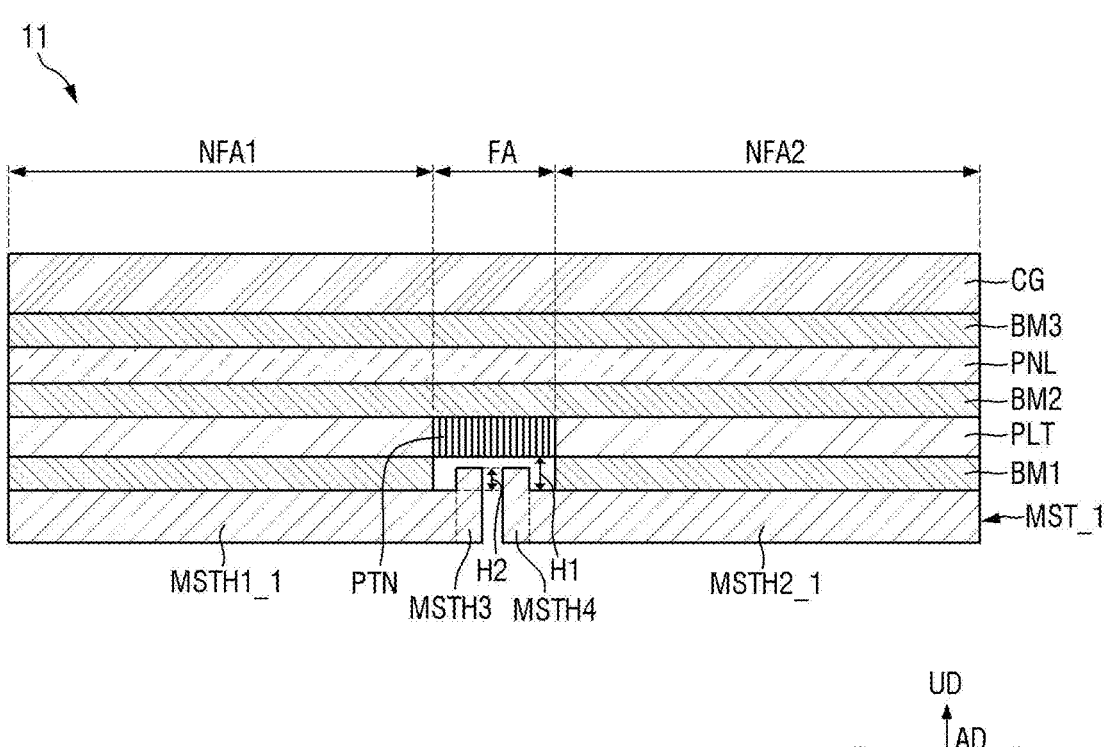
FIG. 19 is a cross-sectional view of a display device according to a second embodiment.
Figure 20:
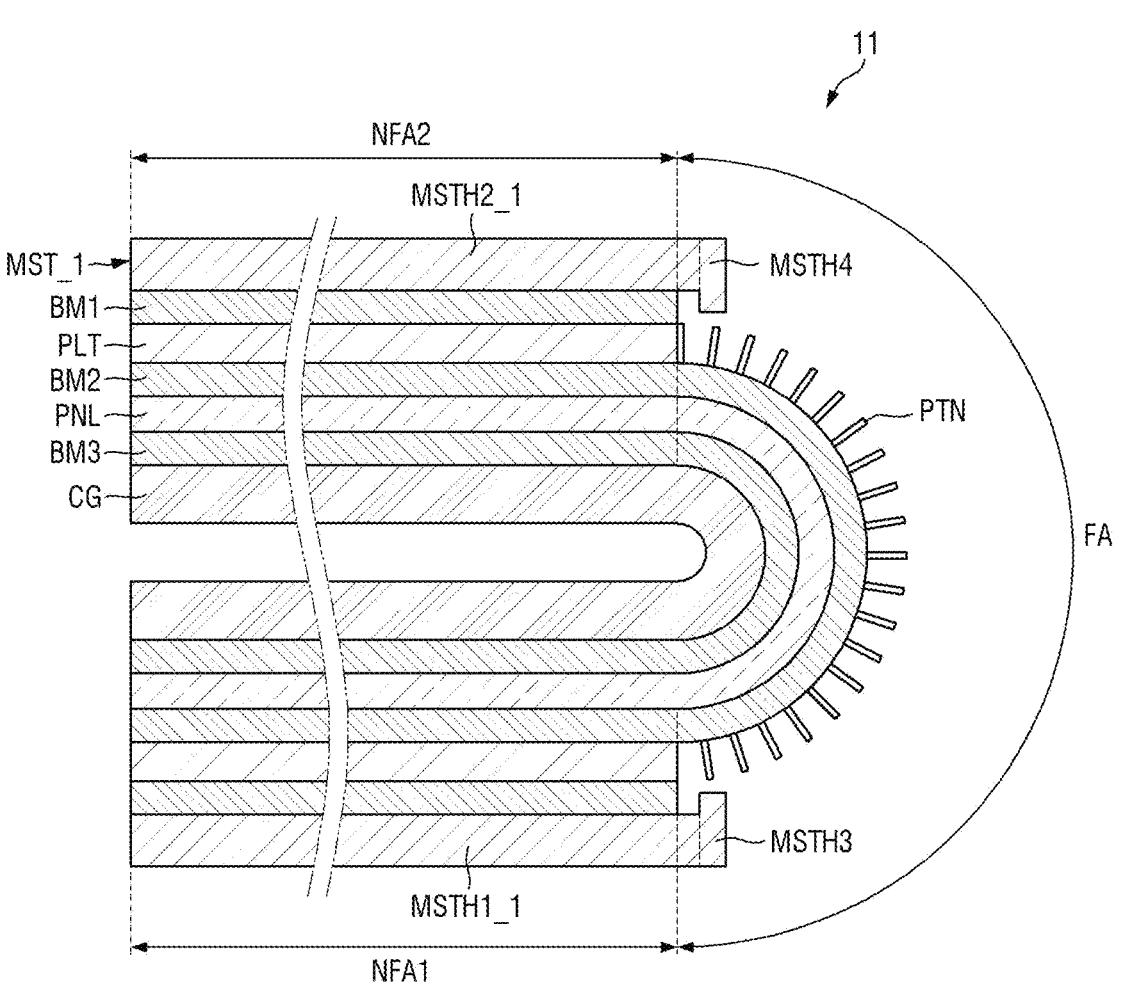
FIG. 20 is a cross-sectional view showing a folded state of the display device according to the second embodiment.
Figure 21:
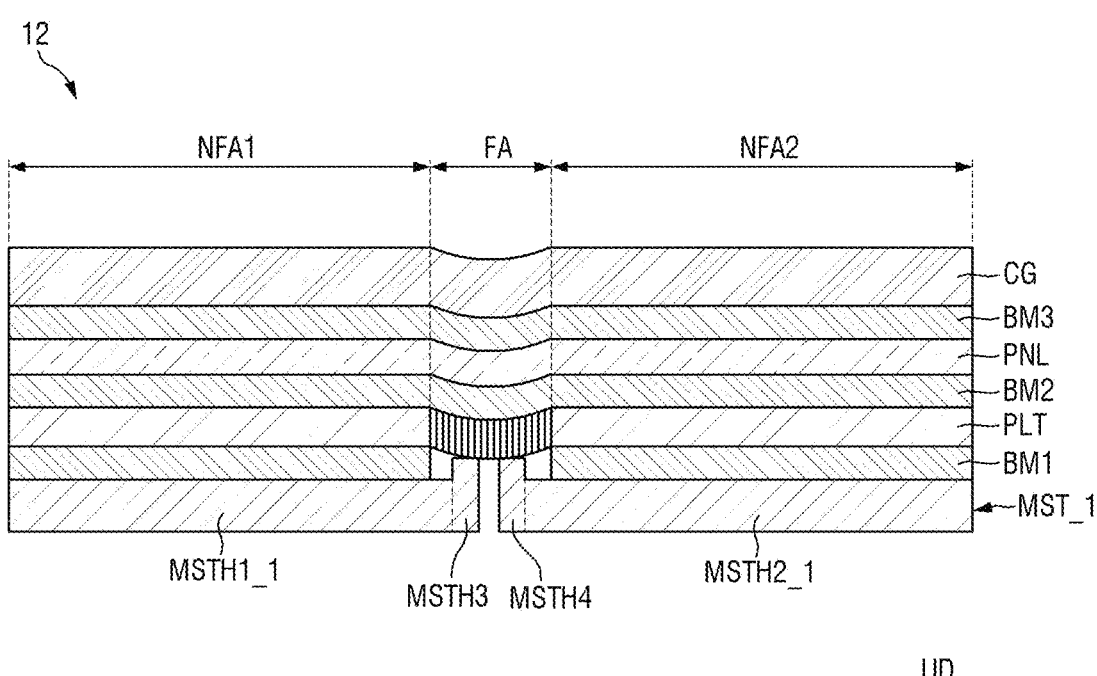
FIG. 21 is a cross-sectional view showing a modified example of the display device according to the second embodiment.

FIG. 19 is a cross-sectional view of a display device according to a second embodiment. FIG. 20 is a cross-sectional view showing a folded state of the display device according to the second embodiment. FIG. 21 is a cross-sectional view showing a modified example of the display device according to the second embodiment.

Referring to FIGS. 19 to 21, a middle plate MST_1 of the display device 11 according to the second embodiment differs from the display device 10 shown in FIG. 4 in that it may also be disposed in the folding area FA.

More specifically, the middle plate MST_1 may protrude upward toward the upper members PNL and PTN in the folding area FA. The middle plate MST_1 may further include a vertical middle plate protruding upward toward the upper members PNL and PTN in the folding area FA. The middle plate MST_1 may be formed through etching. However, the middle plate MST_1 may be formed in any of various ways.

A separation distance between the middle plate MST_1 and the plate PLT in the folding area FA (or a separation distance between the slit patterns PTN) may be smaller than distances between the middle plates MST_1 and the plates PLT in the unfolding areas NFA1 and NFA2. To this end, the vertical middle plate of the middle plate MST_1 may further include a third middle plate portion MSTH3 connected to a first middle plate portion MSTH1_1, and a fourth middle plate portion MSTH4 connected to a second middle plate portion MSTH2_1. The third and fourth middle plate portions MSTH3 and MSTH4 may protrude further upward from surfaces of the first and second middle plate portions MSTH1 and MSTH2 toward the upper members PNL and PTN, respectively. Thicknesses of the third and fourth middle plate portions MSTH3 and MSTH4 may be greater than thicknesses of the first and second middle plate portions MSTH1 and MSTH2, respectively.

Heights of surfaces of the third and fourth middle plate portions MSTH3 and MSTH4 may be greater than heights of surfaces of the first and second middle plate portions MSTH1 and MSTH2, respectively.

The third and fourth middle plate portions MSTH3 and MSTH4 may function to prevent or at least reduce the downward sagging of the cover member CG, the display panel PNL, and the slit pattern PTN of the folding area FA. As described above with reference to FIG. 18, the cover member CG, the display panel PNL, and the slit pattern PTN disposed in the folding area FA have no separate member for supporting themself thereunder, the degrees of sagging of the sagged shapes (or the wrinkle shapes) thereof may become more severe. However, in the case of the display device 11 according to the second embodiment, since the third and fourth middle plate portions MSTH3 and MSTH4, which have higher heights of the surfaces than the first and second middle plate portions MSTH1 and MSTH2, may be disposed in the folding area FA, it is possible to prevent or at least reduce the sagged shapes (or the wrinkle shapes) of the cover member CG, the display panel PNL, and the slit pattern PTN disposed in the folding area FA from becoming more severe over time.

A height H2 protruding at the height of the surface of the first middle plate portion MSTH1_1 of the third and fourth middle plate portions MSTH3 and MSTH4 may be smaller than a height H1 protruding at the height of the surface of the first middle plate portion MSTH1_1 of the first coupling member BM1. A surface of the first coupling member BM1 may be colinearly positioned on a lower surface of the slit pattern PTN. When the surfaces of the third and fourth middle plate portions MSTH3 and MSTH4 are colinearly positioned on the lower surface of the slit pattern PTN and thus the third and fourth middle plate portions MSTH3 and MSTH4 are in direct contact with the slit pattern PTN, physical interference may occur between the slit pattern PTN and the middle plate MST_1 upon the folding operation, and the folding operation may not be smooth.

In addition, in order to allow the third and fourth middle plate portions MSTH3 and MSTH4 to prevent or at least reduce the sagging of the cover member CG, the display panel PNL, and the slit pattern PTN of the folding area FA, the surfaces of the third and fourth middle plate portions MSTH3 and MSTH4 may be preferably positioned between the lower and upper surfaces of the first coupling member BM1. However, the present disclosure is not limited thereto, and the heights of the surfaces of the third and fourth middle plate portions MSTH3 and MSTH4 may be colinearly positioned on the height of the surface (or the height of the upper surface) of the first coupling member BM1.

Furthermore, in order to allow the third and fourth middle plate portions MSTH3 and MSTH4 to easily prevent or at least reduce the sagging of the cover member CG, the display panel PNL, and the slit pattern PTN of the folding area FA, the third and fourth middle plate portions MSTH3 and MSTH4 may be preferably positioned on a central portion of the folding area FA. Therefore, the first and second middle plate portions MSTH1_1 and MSTH2_1 may each extend to the folding area FA. Since the first and second middle plate portions MSTH1_1 and MSTH2_1 each extend to the folding area FA and each of the middle plate portions MSTH3 and MSTH4 is connected to the adjacent first and second middle plate portions MSTH1_1 and MSTH2_1, the third and fourth middle plate portions MSTH3 and MSTH4 may be spaced apart from inner surfaces of the first coupling members BM1 positioned in each of the unfolding areas NFA1 and NFA2.

The third and fourth middle plate portions MSTH3 and MSTH4 of the display device 11 according to the second embodiment may be spaced apart from each other with respect to a bisector of the folding area FA. The reason why the third and fourth middle plate portions MSTH3 and MSTH4 are separated with respect to the bisector of the folding area FA is to smoothly perform the folding operation through the hinge assembly 200 of the display device 10. As described above with reference to FIG. 3, since the middle plate MST_1 is made of a material such as plastic, polyimide, or metal to increase the rigidity of the display device 11, a stress acting on the display device 11 may increase upon the folding operation when the middle plate MST_1 is formed integrally across the unfolding areas NFA1 and NFA2 and the folding area FA. Therefore, like the middle plate MST of the display device 10 shown in FIG. 4, the first and third mid plate portions MSTH1_1 and MSTH3 may be physically spaced apart from the second and fourth mid plate portions MSTH2_1 and MSTH4.

As shown in FIG. 21, when the folding and unfolding states of the display device 11 are repeated, the folding area FA may sag downward as shown in FIG. 18.

More specifically, since the folding area FA has large deformation when repeating the folding/unfolding operations, the cover member CG, the display panel PNL, and the slit pattern PTN disposed in the folding area FA may each sage downward and may not be restored to original states. Even when the cover member CG, the display panel PNL, and the slit pattern PTN disposed in the folding area FA are restored, a restoration time may be a predetermined time or longer, and in this case, the sagged shape (or the wrinkle shape) may be visible from the outside, causing display defects. In addition, since the cover member CG, the display panel PNL, and the slit pattern PTN disposed in the folding area FA do not have a separate member for supporting themself thereunder, the degrees of sagging of the sagged shapes thereof may become severe over time.

However, according to the display device 11 according to the second embodiment, since the third and fourth middle plate portions MSTH3 and MSTH4 of the folding area FA are formed to protrude further from the surfaces of the first and second middle plate portions MSTH1 and MSTH2 toward the upper members PNL and PTN, respectively, even when the cover member CG, the display panel PNL, and the slit pattern PTN disposed in the folding area FA sag downward due to the repetition of the folding state/unfolding state, the cover member CG, the display panel PNL, and the slit pattern PTN may sag only to the surfaces of the third and fourth middle plate portions MSTH3 and MSTH4 (the third and fourth middle plate portions MSTH3 and MSTH4 are in contact with the slit pattern PTN). Therefore, it is possible to shorten the restoration times of the cover member CG, the display panel PNL, and the slit pattern PTN disposed in the folding area FA.

In addition, it is possible to prevent or at least reduce the sagged shape (or the wrinkle shape) of the folding area FA from being visible from the outside to cause display defects. In addition, since the slit pattern PTN sags only to the surfaces of the third and fourth middle plate portions MSTH3 and MSTH4, it is possible to improve the sagging phenomenon (or wrinkle generation phenomenon) of the folding area FA.

In addition, since the middle plate portion MST_1 is spaced apart from the display panel PNL with the plates PLT and PTN interposed therebetween, it is possible to prevent or at least reduce the phenomenon in which the additional stress is applied to the display panel PNL by additionally forming the third and fourth middle plate portions MSTH3 and MSTH4.

Since the remaining descriptions have been made above with reference to FIGS. 1 to 18, detailed description thereof will be omitted below.

The above description and the accompanying drawings are merely illustrative of the technical spirit of the present specification, and those skilled in the art to which the present specification pertains can perform various changes or modifications, such as coupling, separation, substitution, and change of components, without departing from the essential characteristics of the present specification. Therefore, the embodiments disclosed herein are not intended to limit the technical spirit of the present specification, but to describe the same, and the scope of the technical spirit of the present specification is not limited by these embodiments. The scope of the present specification should be construed according to the appended claims, and all technical spirits within the equivalent range should be construed as being included in the scope of the present specification.

DESCRIPTION OF REFERENCE NUMERALS

10: display device
PLT: plate
PTN: slit pattern
MST: middle plate
MSTH1 to MSTH4: first to fourth middle plates
PNL: display panel
CG: cover member

What is claimed is:

1. A display device comprising:
   a panel assembly including:
      a display panel including a first unfolding area, a second unfolding area, and a folding area between the first unfolding area and the second unfolding area, and
      a plate under the display panel, the plate including a slit pattern in the folding area; and
   a middle plate under the plate,
   wherein the middle plate includes a first middle plate portion in the first unfolding area, a second middle plate portion in the second unfolding area, and a vertical middle plate portion in the folding area, and wherein in an unfolded state of the display device, the slit pattern in the folding area is spaced apart from the vertical middle plate portion.

2. The display device of claim 1, wherein the vertical middle plate portion protrudes toward the plate.

3. The display device of claim 2, wherein the vertical middle plate portion includes a third middle plate portion connected to the first middle plate portion, and a fourth middle plate portion connected to the second middle plate portion.

4. The display device of claim 3, wherein the third middle plate portion and the fourth middle plate portion are spaced apart from each other.

5. The display device of claim 3, wherein a distance between the third middle plate portion and the plate is shorter than a distance between the first middle plate portion and the plate.

6. The display device of claim 3, wherein a distance between the fourth middle plate portion and the plate is shorter than a distance between the second middle plate portion and the plate.

7. The display device of claim 1, wherein in a folded state of the display device, the first unfolding area and the second unfolding area are folded with respect to the folding area and overlap each other.

8. The display device of claim 1, wherein in the unfolded state, the folding area of the display panel sags downward.

9. The display device of claim 1, wherein the slit pattern in the folding area is in direct contact with the vertical middle plate portion, when the folding area of the display panel sags downward.

10. The display device of claim 1, further comprising:
an in-folding hinge assembly in the folding area under the panel assembly, the in-folding hinge assembly including a hinge cover.

11. The display device of claim 10, further comprising:
a first frame cover and a second frame cover coupled to the in-folding hinge assembly.

12. The display device of claim 10, wherein the in-folding hinge assembly includes:
a first hinge arm and a second hinge arm connected rotatably;
a first bevel gear and a second bevel gear coupled to the first hinge arm and the second hinge arm, respectively, in a vertical direction; and
a first gear arm and a second gear arm fastened to interwork with the first hinge arm and the second hinge arm,
wherein the display panel performs folding and unfolding operations about a rotation axis which differs from center axes of the first bevel gear and the second bevel gear.

13. The display device of claim 12, wherein the first bevel gear and the second bevel gear are engaged, and the first bevel gear and the second bevel gear each includes a second idle gear that engages with a first idle gear of each of the first hinge arm and the second hinge arm.

14. The display device of claim 13, wherein the first idle gear and the second idle gear are in a direction perpendicular to each other.

15. A display device comprising:
a panel assembly including:
a display panel including a first unfolding area, a second unfolding area, and a folding area between the first unfolding area and the second unfolding area, and
a plate under the display panel, the plate including a slit pattern in the folding area; and
a middle plate under the plate,
wherein a distance between the middle plate and the plate in the folding area is shorter than a distance between the middle plate and the plate in the first unfolding area, and
wherein in an unfolded state of the display device, the slit pattern in the folding area is spaced apart from a portion of the middle plate in the folding area.

16. The display device of claim 15, wherein the middle plate includes a first middle plate portion in the first unfolding area, a second middle plate portion in the second unfolding area, and a vertical middle plate portion in the folding area, and wherein the vertical middle plate portion protrudes toward the plate.

17. The display device of claim 16, wherein the vertical middle plate portion includes a third middle plate portion connected to the first middle plate portion, and a fourth middle plate portion connected to the second middle plate portion, and wherein the third middle plate portion and the fourth middle plate portion are spaced apart from each other.

18. The display device of claim 17, wherein the first unfolding area and the second unfolding area are folded with respect to the folding area, wherein the first unfolding area and the second unfolding area overlap each other in a folded state of the display device, and wherein the slit pattern in the folding area is spaced apart from the vertical middle plate portion in the unfolded state.

19. The display device of claim 18, wherein in the unfolded state, the folding area of the display panel sags downward, and wherein the slit pattern in the folding area is in direct contact with the vertical middle plate portion when the folding area of the display panel sags downward.

* * * * *